US012665999B2

(12) United States Patent　　(10) Patent No.:　US 12,665,999 B2
Ito et al.　　(45) Date of Patent:　Jun. 23, 2026

(54) WEARABLE TERMINAL DEVICE, PROGRAM, AND DISPLAY METHOD

(71) Applicant: KYOCERA Corporation, Kyoto (JP)

(72) Inventors: Shingo Ito, Kyoto (JP); Tomokazu Adachi, Yokohama (JP); Kai Shimizu, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 329 days.

(21) Appl. No.: 18/552,753

(22) PCT Filed: Mar. 29, 2021

(86) PCT No.: PCT/JP2021/013256
§ 371 (c)(1),
(2) Date: Sep. 27, 2023

(87) PCT Pub. No.: WO2022/208600
PCT Pub. Date: Oct. 6, 2022

(65) Prior Publication Data
US 2024/0187562 A1　　Jun. 6, 2024

(51) Int. Cl.
*H04N 13/361*　　(2018.01)
*G06F 3/16*　　(2006.01)
*G06T 19/00*　　(2011.01)
*H04N 13/344*　　(2018.01)
*H04N 13/398*　　(2018.01)

(52) U.S. Cl.
CPC .......... *H04N 13/361* (2018.05); *G06F 3/167* (2013.01); *G06T 19/006* (2013.01); *H04N 13/344* (2018.05); *H04N 13/398* (2018.05)

(58) Field of Classification Search
CPC ............. G06T 2219/024; G06T 19/006; G06F 3/1454; G09G 5/14
See application file for complete search history.

(56) References Cited

U.S. PATENT DOCUMENTS 6,611,242 B1 * 8/2003 Hongo ................... H04N 7/185
　　　　　　　　　　　　　　　345/2.1
2007/0002037 A1 * 1/2007 Kuroki .................. G06T 19/006
　　　　　　　　　　　　　　　345/418
2011/0286533 A1 * 11/2011 Fortney .......... H04N 21/234309
　　　　　　　　　　　　　　　375/E7.2

(Continued)

FOREIGN PATENT DOCUMENTS

JP　　H08-305663 A　　11/1996
JP　　2000-299851 A　　10/2000

(Continued)

*Primary Examiner* — Yuzhen Shen
(74) *Attorney, Agent, or Firm* — Studebaker Brackett PLLC

(57) ABSTRACT

A wearable terminal device is configured to be used by being worn by a user. The wearable terminal device includes at least one processor. The at least one processor causes a display to display an instructional image located inside a space based on an instruction of an instructor. The at least one processor causes the display to display a plurality of the instructional images based on instructions of a plurality of the instructors using a different display mode for each instructor who gave an instruction. In this way, who instructed display of each of the plurality of instructional images can be easily and intuitively grasped.

21 Claims, 13 Drawing Sheets

(56) References Cited

U.S. PATENT DOCUMENTS

| | | | |
|---|---|---|---|
| 2013/0198653 A1* | 8/2013 | Tse ........................ | G06F 3/0484 |
| | | | 715/751 |
| 2016/0055676 A1* | 2/2016 | Kasahara .............. | G06T 19/003 |
| | | | 345/633 |
| 2018/0122333 A1* | 5/2018 | Horiike .................... | H04N 5/64 |
| 2019/0087021 A1 | 3/2019 | Balan et al. | |
| 2019/0340822 A1 | 11/2019 | Ernst et al. | |
| 2023/0146677 A1* | 5/2023 | Woo ........................ | G06F 3/017 |
| | | | 345/156 |

FOREIGN PATENT DOCUMENTS

| | | | |
|---|---|---|---|
| JP | 2002-368762 A | 12/2002 |
| JP | 2007-042073 A | 2/2007 |
| JP | 2015-019679 A | 2/2015 |
| JP | 2016-148858 A | 8/2016 |
| JP | 2021-033364 A | 3/2021 |
| WO | 2014/162825 A1 | 10/2014 |
| WO | 2016/158000 A1 | 10/2016 |

* cited by examiner

WEARABLE TERMINAL DEVICE, PROGRAM, AND DISPLAY METHOD

TECHNICAL FIELD

The present disclosure relates to a wearable terminal device, a program, and a display method.

BACKGROUND OF INVENTION

Heretofore, virtual reality (VR), mixed reality (MR), and augmented reality (AR) are known technologies that allow a user to experience virtual images and/or virtual spaces by using a wearable terminal device that is worn on the head of the user. A wearable terminal device includes a display that covers the field of view of the user when worn by the user. Virtual images and/or virtual spaces are displayed on this display in accordance with the position and orientation of the user in order to achieve a visual effect in which the virtual images and/or virtual spaces appear to actually exist (for example, specification of U.S. Patent Application Publication No. 2019/0087021 and specification of U.S. Patent Application Publication No. 2019/0340822).

MR is a technology that allows users to experience a mixed reality in which a real space and virtual images are merged together by displaying virtual images that appear to exist at prescribed positions in the real space while the user sees the real space. VR is a technology that allows a user to feel as though he or she is in a virtual space by allowing him or her to see a virtual space instead of a real space in MR.

Virtual images displayed in VR and MR have display positions defined in the space in which the user is located, and the virtual images are displayed on the display and are visible to the user when the display positions are within a visible area for the user.

SUMMARY

In the present disclosure, a wearable terminal device is configured to be used by being worn by a user. The wearable terminal device includes at least one processor. The at least one processor causes a display to display an instructional image located inside a space based on an instruction of an instructor. The at least one processor causes the display to display a plurality of the instructional images based on instructions of a plurality of the instructors using a different display mode for each instructor who gave an instruction.

In the present disclosure, a program is configured to cause a computer cause to cause a display to display an instructional image located inside a space based on an instruction of an instructor, the computer being provided in a wearable terminal device configured to be used by being worn by the user. The program is configured to cause the computer to cause the display to display a plurality of the instructional images based on instructions of a plurality of the instructors in a different display mode for each instructor who gave an instruction.

In the present disclosure, a display method is a display method for use in a wearable terminal device configured to be used by being worn by a user. In the display method, a display is caused to display an instructional image located inside a space based on an instruction of an instructor. In the display method, the display is caused to display a plurality of the instructional images based on instructions of a plurality of the instructors in a different display mode for each instructor who gave an instruction.

DESCRIPTION OF EMBODIMENTS

Hereafter, embodiments will be described based on the drawings. However, for convenience of explanation, each figure referred to below is a simplified illustration of only the main components that are needed in order to describe the embodiments. Therefore, a wearable terminal device 10, an external device 20, and an information processing apparatus 80 of the present disclosure may include any components not illustrated in the referenced figures.

First Embodiment

Figure 1:
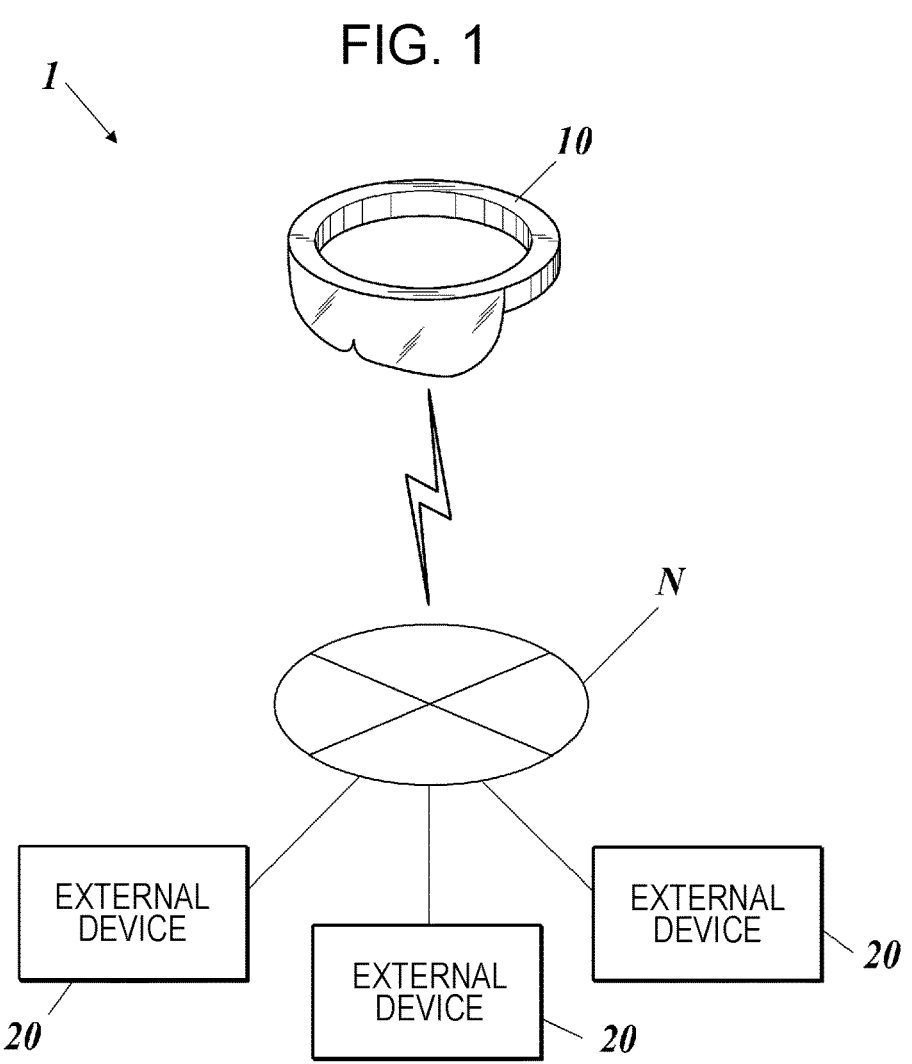
FIG. 1 is a schematic diagram illustrating the configuration of a display system according to a First Embodiment.

As illustrated in FIG. 1, a display system 1 includes a wearable terminal device 10 and multiple external devices 20. The display system 1 and the external devices 20 are connected to each other via a network N so as to be able to communicate with each other. The network N may be, but is not limited to, the Internet. The display system 1 may include multiple wearable terminal devices 10. Alternatively, there may be just a single external device 20 in the display system 1.

The wearable terminal device 10 is a device that allows a user (wearer) to experience MR. In this embodiment, a user performing prescribed work wears the wearable terminal device 10. Each external device 20 is operated by a remote instructor who gives instructions to the user wearing the wearable terminal device 10 from a remote location via the wearable terminal device 10.

Figure 2:
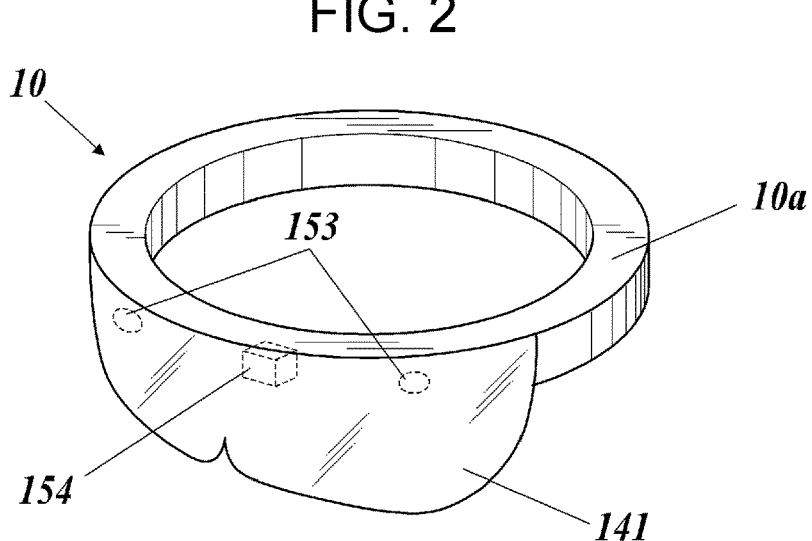
FIG. 2 is a schematic perspective view illustrating the configuration of a wearable terminal device.

As illustrated in FIG. 2, the wearable terminal device 10 includes a body 10*a* and a visor 141 (display member) attached to the body 10*a*.

The body 10*a* is a ring-shaped member whose circumference can be adjusted. Various devices, such as a depth sensor 153 and a camera 154, are built into the body 10*a*. When the body 10*a* is worn on the user's head, the user's field of view is covered by the visor 141.

The visor 141 is transparent to light. The user can see a real space through the visor 141. An image such as a virtual image is projected and displayed on a display surface of the visor 141, which faces the user's eyes, from a laser scanner 142 (refer to FIG. 5), which is built into the body 10*a*. The user sees the virtual image in the form of light reflected from the display surface. At this time, since the user is also viewing the real space through the visor 141, a visual effect is obtained as though the virtual image exists in the real space.

Figure 3:
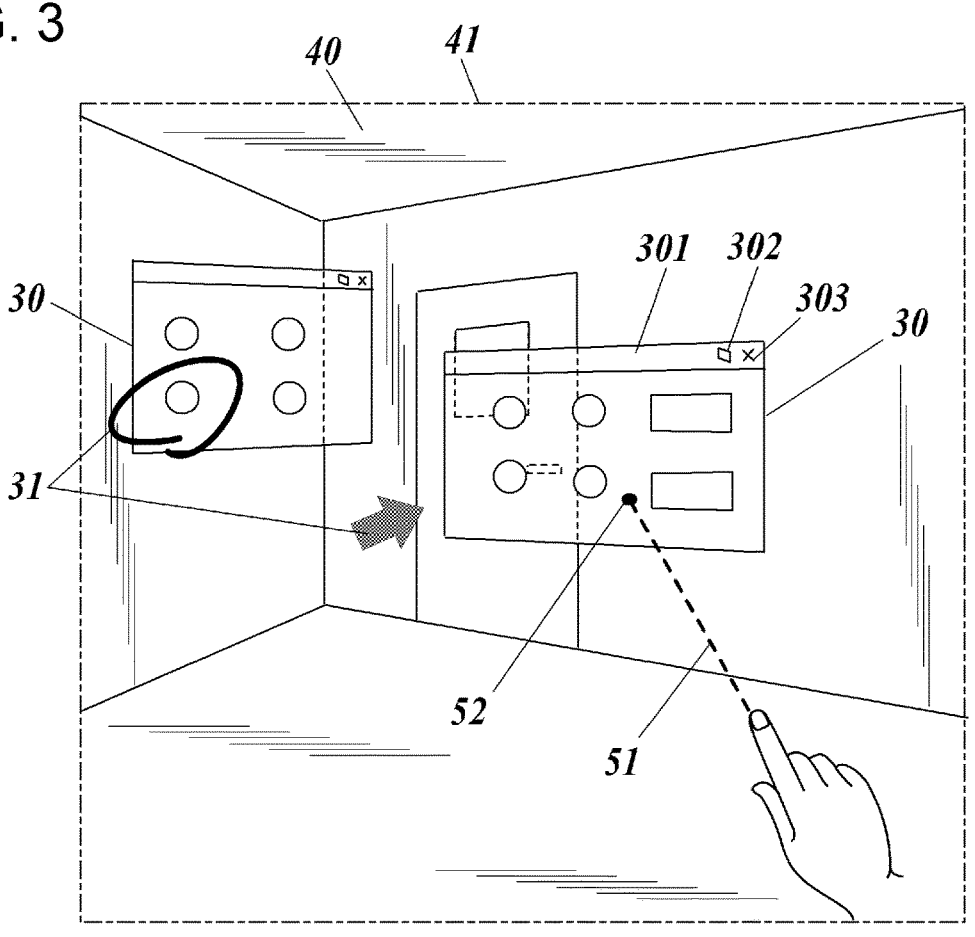
FIG. 3 illustrates an example of a visible area and a virtual image seen by a user wearing a wearable terminal device.

As illustrated in FIG. 3, with virtual images 30 displayed, the user sees the virtual images 30 at prescribed positions in a space 40 with the virtual images 30 facing in prescribed directions. In this embodiment, the space 40 is the real space that the user sees through the visor 141. The virtual images 30 are projected onto a light-transmissive visor 141 so as to be seen as translucent images superimposed on the real space. In FIG. 3, an example is illustrated in which the virtual images 30 are flat window screens. The virtual images 30 also include instructional images 31 for providing instructions or explanations to the user of the wearable terminal device 10. In other words, the instructional images 31 are a form of virtual image 30. In FIG. 3, an instructional image 31 of an arrow and an instructional image 31 of a path traced by pen input are illustrated as examples. The virtual images 30 are not limited to these example, and may be various types of three-dimensional images, for example. If the virtual images 30 are window screens, the virtual images 30 have front surfaces (first surfaces) and rear surfaces (second surfaces), and necessary information is displayed on the front surfaces and typically no information is displayed on the rear surfaces.

Figure 4:
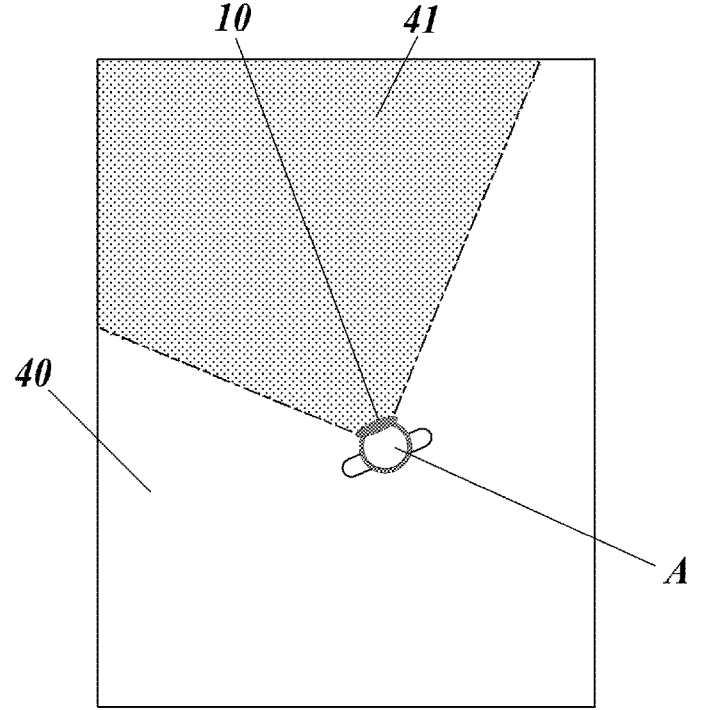
FIG. 4 is a diagram for explaining a visible area in space.

The wearable terminal device 10 detects a visible area 41 for the user based on the position and orientation of the user in the space 40 (in other words, the position and orientation of the wearable terminal device 10). As illustrated in FIG. 4, the visible area 41 is the area of the space 40 that is located in front of a user A wearing the wearable terminal device 10. For example, the visible area 41 is an area within a prescribed angular range from the front of user A in the left-right directions and up-down directions. In this case, a cross section obtained when a three-dimensional object corresponding to the shape of the visible area 41 is cut along a plane perpendicular to the frontal direction of the user A is rectangular. The shape of the visible area 41 may be defined so that the cross section has a shape other than a rectangular shape (for example, a circular or oval shape). The shape of the visible area 41 (for example, the angular range from the front in left-right directions and up-down directions) can be specified for example using the following method.

In the wearable terminal device 10, the field of view is adjusted (hereinafter referred to as "calibrated") in a prescribed procedure at a prescribed timing, such as when the device is first started up. In this calibration, the area that can be seen by the user identified, and the virtual images 30 are displayed within that area thereafter. The shape of the visible area 41 can be set as the shape of the visible area identified by this calibration.

Calibration is not limited to being performed using the prescribed procedure described above, and calibration may be performed automatically during normal operation of the wearable terminal device 10. For example, if the user does not react to a display that the user is supposed to react to, the field of view (and the shape of the visible area 41) may be adjusted while assuming that the area where the display is performed is outside the user's field of view. The field of view (and the shape of the visible area 41) may be adjusted by performing display on a trial basis at a position that is defined as being outside the range of the field of view, and if the user does react to the display, the area where the display is performed may be considered as being within range of the user's field of view.

The shape of the visible area 41 may be determined in advance and fixed at the time of shipment or the like and not based on the result of adjustment of the field of view. For example, the shape of the visible area 41 may be defined by the optical design of a display 14 to the maximum extent possible.

The virtual images 30 are generated in accordance with prescribed operations performed by the user with display positions and orientations defined in the space 40. The instructional images 31, among the virtual images 30, are generated based on instructional data transmitted from the external devices 20 to the wearable terminal device 10, for example. The instructional images 31 can also be generated by the user of the wearable terminal device 10 to serve as reminders and so forth. Out of the generated virtual images 30, the wearable terminal device 10 displays the virtual images 30 whose display positions are defined inside the visible area 41 by projecting the virtual images 30 onto the visor 141. In FIG. 3, the visible area 41 is represented by a chain line.

The display positions and orientations of the virtual images 30 on the visor 141 are updated in real time in accordance with changes in the visible area 41 for the user. In other words, the display positions and orientations of the virtual images 30 change in accordance with changes in the visible area 41 so that the user perceives that "the virtual images 30 are located within the space 40 at set positions and with set orientations". For example, as the user moves from the front sides to the rear sides of the virtual images 30, the shapes (angles) of the displayed virtual images 30 gradually change in accordance with this movement. When the user moves around to the rear side of a virtual image 30 and then turns toward the virtual image 30, the rear surface of the virtual image 30 is displayed so that the user can see the rear surface. In accordance with changes in the visible area 41, the virtual images 30 whose display positions have shifted out of the visible area 41 are no longer displayed, and if there are any virtual images 30 whose display positions have now entered the visible area 41, those virtual images 30 are newly displayed.

As illustrated in FIG. 3, when the user holds his or her hand (or finger) forward, the direction in which the hand is extended is detected by the wearable terminal device 10, and a virtual line 51 extending in that direction and a pointer 52 are displayed on the display surface of the visor 141 for the user to see. The pointer 52 is displayed at the intersection of the virtual line 51 and a virtual image 30. If the virtual line 51 does not intersect any virtual image 30, the pointer 52 may be displayed at the intersection of the virtual line 51 and a wall of the space 40 or the like. When the distance between the hand of the user and the virtual image 30 is within a prescribed reference distance, the pointer 52 may be directly displayed at a position corresponding to the finger tip of the user without displaying the virtual line 51.

The user can adjust the direction of the virtual line 51 and the position of the pointer 52 by changing the direction in which the user extends his or her hand. When a prescribed gesture is performed with the pointer 52 adjusted so as to be positioned at a prescribed operation target (for example, a function bar 301, a window shape change button 302, or a close button 303) included in the virtual image 30, the gesture can be detected by the wearable terminal device 10 and a prescribed operation can be performed on the operation target. For example, with the pointer 52 aligned with the close button 303, the virtual image 30 can be closed (deleted) by performing a gesture for selecting an operation target (for example, a pinching gesture made using the fingertips). The virtual image 30 can be moved in the depth direction and in left-right directions by making a selection gesture with the pointer 52 aligned with the function bar 301, and then making a gesture of moving the hand back and forth and left and right while maintaining the selection gesture. Operations that can be performed on the virtual images 30 are not limited to these examples.

Thus, the wearable terminal device 10 of this embodiment can realize a visual effect as though the virtual images 30 exist in the real space, and can accept user operations performed on the virtual images 30 and reflect these operations in the display of the virtual images 30. In other words, the wearable terminal device 10 of this embodiment provides MR.

Next, the functional configuration of the wearable terminal device 10 will be described while referring to FIG. 5. The wearable terminal device 10 includes a central processing unit (CPU) 11, a random access memory (RAM) 12, a storage unit 13, the display 14, a sensor unit 15, a communication unit 16, a microphone 17, and a speaker 18, and these components are connected to each other by a bus 19. Each of the components illustrated in FIG. 5, except for the visor 141 of the display 14, is built into the body 10a and operates with power supplied from a battery, which is also built into the body 10a.

The CPU 11 is a processor that performs various arithmetic operations and performs overall control of the operations of the various parts of the wearable terminal device 10. The CPU 11 reads out and executes a program 131 stored in storage unit 13 in order to perform various control operations. The CPU 11 executes the program 131 in order to perform, for example, visible area detection processing and display control processing. Among these processing operations, the visible area detection processing is processing for detecting the visible area 41 for the user inside the space 40. The display control processing is processing for causing the display 14 to display the virtual images 30 whose positions are defined inside the visible area 41 from among the virtual images 30 whose positions are defined in the space 40.

Figure 5:
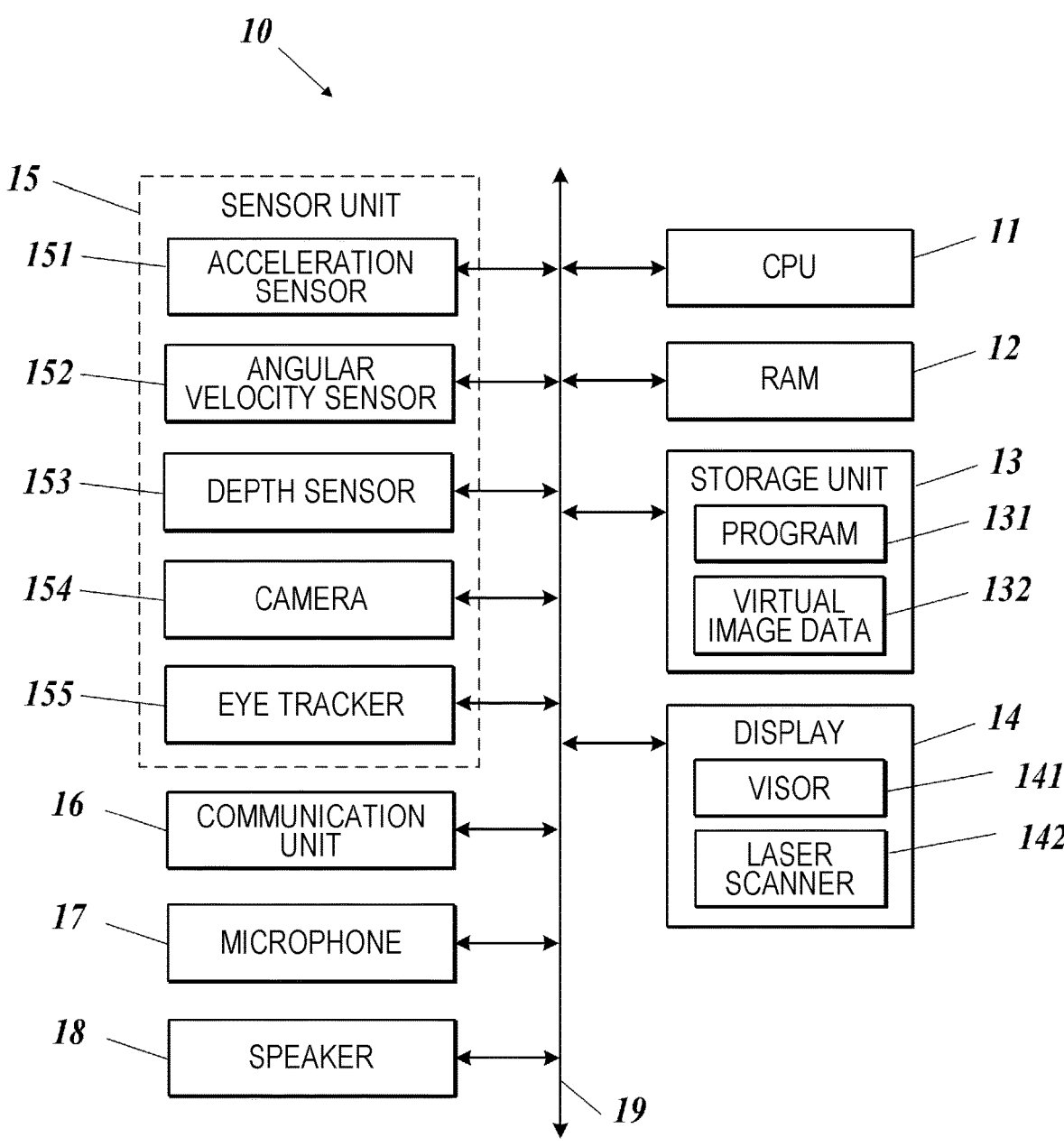
FIG. 5 is a block diagram illustrating the main functional configuration of the wearable terminal device.

A single CPU 11 is illustrated in FIG. 5, but the configuration is not limited to a single CPU 11. Two or more processors, such as CPUs, may be provided, and these two or more processors may share the processing performed by the CPU 11 in this embodiment.

The RAM 12 provides a working memory space for the CPU 11 and stores temporary data.

The storage unit 13 is a non-transitory recording medium that can be read by the CPU 11 serving as a computer. The storage unit 13 stores the program 131 executed by the CPU 11 and various settings data. The program 131 is stored in storage unit 13 in the form of computer-readable program code. For example, a nonvolatile storage device such as a solid state drive (SSD) including a flash memory can be used as the storage unit 13.

The data stored in storage unit 13 includes virtual image data 132 relating to virtual images 30. The virtual image data 132 includes data relating to display content of the virtual images 30 (for example, image data), display position data, and orientation data. The virtual image data 132 relating to the instructional image 31 of an arrow includes data on the size, color, display position, and orientation of the arrow. The virtual image data 132 relating to the instructional image 31 of the path traced by pen input includes data on the thickness, color, display position (including coordinates of each point along path), and the orientation of the path. The virtual image data 132 relating to the instructional image 31 of a document image includes data on the content of the document image and the size, color, display position, and orientation of the window.

The display 14 includes the visor 141, the laser scanner 142, and an optical system that directs light output from the laser scanner 142 to the display surface of the visor 141. The laser scanner 142 irradiates the optical system with a pulsed laser beam, which is controlled so as to be switched on and off for each pixel, while scanning the beam in prescribed directions in accordance with a control signal from the CPU 11. The laser light incident on the optical system forms a display screen composed of a two-dimensional pixel matrix on the display surface of the visor 141. The method employed by the laser scanner 142 is not particularly limited, but for example, a method in which the laser light is scanned by operating a mirror using micro electro mechanical systems (MEMS) can be used. The laser scanner 142 includes three light-emitting units that emit laser light in colors of RGB, for example. The display 14 can perform color display by projecting light from these light-emitting units onto the visor 141.

The sensor unit 15 includes an acceleration sensor 151, an angular velocity sensor 152, the depth sensor 153, the camera 154, and an eye tracker 155. The sensor unit 15 may further include sensors that are not illustrated in FIG. 5.

The acceleration sensor 151 detects the acceleration and outputs the detection results to the CPU 11. From the detection results produced by the acceleration sensor 151, translational motion of the wearable terminal device 10 in directions along three orthogonal axes can be detected.

The angular velocity sensor 152 (gyro sensor) detects the angular velocity and outputs the detection results to the CPU 11. The detection results produced by the angular velocity sensor 152 can be used to detect rotational motion of the wearable terminal device 10.

The depth sensor 153 is an infrared camera that detects the distance to a subject using the time of flight (ToF) method, and outputs the distance detection results to the CPU 11. The depth sensor 153 is provided on a front surface of the body 10a such that images of the visible area 41 can be captured. The entire space 40 can be three-dimensionally mapped (i.e., a three-dimensional structure can be acquired) by repeatedly performing measurements using the depth sensor 153 each time the position and orientation of the user change in the space 40 and then combining the results.

The camera 154 captures images of the space 40 using a group of RGB imaging elements, acquires color image data as results of the image capturing, and outputs the results to the CPU 11. The camera 154 is provided on the front surface of the body 10a so that images of the visible area 41 can be captured. The images output from the camera 154 are used to detect the position, orientation, and so on of the wearable terminal device 10, and are also transmitted from the communication unit 16 to the external devices 20 and used to display the visible area 41 for the user of the wearable terminal device 10 on the external devices 20.

The eye tracker 155 detects the user's line of sight and outputs the detection results to the CPU 11. The method used for detecting the line of sight is not particularly limited, but for example, a method can be used in which an eye tracking camera is used to capture images of the reflection points of near-infrared light in the user's eyes, and the results of that image capturing and the images captured by the camera 154 are analyzed in order to identify a target being looked at by the user. Part of the configuration of the eye tracker 155 may be provided in or on a peripheral portion of the visor 141, for example.

The communication unit 16 is a communication module that includes an antenna, a modulation-demodulation circuit, and a signal processing circuit. The communication unit 16 transmits and receives data via wireless communication with the external devices 20 in accordance with a prescribed communication protocol. The communication unit 16 also communicates speech data to and from the external devices 20. In other words, the communication unit 16 transmits speech data collected by the microphone 17 to the external devices 20 and receives speech data transmitted from the external devices 20 in order to output speech from the speaker 18.

The microphone 17 converts sounds such as speech of the user into electrical signals and outputs the electrical signals to the CPU 11.

The speaker 18 converts the input speech data into mechanical vibrations and outputs the mechanical vibrations as sound.

In the wearable terminal device 10 having the above-described configuration, the CPU 11 performs the following control operations.

The CPU 11 performs three-dimensional mapping of the space 40 based on distance data to a subject input from the depth sensor 153. The CPU 11 repeats this three-dimensional mapping whenever the position and orientation of the user change, and updates the results each time. The CPU 11 also performs three-dimensional mapping for each connected space 40 serving as a unit. Therefore, when the user moves between multiple rooms that are partitioned from each other by walls and so on, the CPU 11 recognizes each room as a single space 40 and separately performs three-dimensional mapping for each room.

The CPU 11 detects the visible area 41 for the user in the space 40. In detail, the CPU 11 identifies the position and orientation of the user (wearable terminal device 10) in the space 40 based on detection results from the acceleration sensor 151, the angular velocity sensor 152, the depth sensor 153, the camera 154, and the eye tracker 155, and accumulated three-dimensional mapping results. The visible area 41 is then detected (identified) based on the identified position and orientation and the predetermined shape of the visible area 41. The CPU 11 continuously detects the position and orientation of the user in real time, and updates the visible area 41 in conjunction with changes in the position and orientation of the user. The visible area 41 may be detected using detection results from some of the components out of the acceleration sensor 151, the angular velocity sensor 152, the depth sensor 153, the camera 154, and the eye tracker 155.

The CPU 11 generates the virtual image data 132 relating to the virtual images 30 in accordance with operations performed by the user. In other words, upon detecting a prescribed operation (gesture) instructing generation of a virtual image 30, the CPU 11 identifies the display content (for example, image data), display position, and orientation of the virtual image, and generates virtual image data 132 including data representing these specific results.

The CPU 11 causes the display 14 to display the virtual images 30 whose display positions are defined inside the visible area 41, in other words, the virtual images 30 located inside the visible area 41. The CPU 11 identifies virtual images 30 that are to be displayed based on information of the display positions included in the virtual image data 132, and generates image data of the display screen to be displayed on the display 14 based on the positional relationship between the visible area 41 and the display positions of the virtual images 30 at that point in time. The CPU 11 causes the laser scanner 142 to perform a scanning operation based on this image data in order to form a display screen containing the virtual images 30 on the display surface of the visor 141. In other words, the CPU 11 causes the virtual images 30 to be displayed on the display surface of the visor 141 so that the virtual images 30 are visible in the space 40 seen through the visor 141. By continuously performing this display control processing, the CPU 11 updates the display contents displayed on the display 14 in real time so as to match the user's movements (changes in the visible area 41). If the wearable terminal device 10 is set up to continue holding the virtual image data 132 even after the wearable terminal device 10 is turned off, the next time the wearable terminal device 10 is turned on, the existing virtual image data 132 is read and if there are virtual images 30 located inside the visible area 41, these virtual images 30 are displayed on the display 14.

The CPU 11 detects the position and orientation of the user's hand (and/or fingers) based on images captured by the depth sensor 153 and the camera 154, and causes the display 14 to display a virtual line 51 extending in the detected direction and the pointer 52. The CPU 11 detects a gesture made by the user's hand (and/or fingers) based on images captured by the depth sensor 153 and the camera 154, and performs processing in accordance with the content of the detected gesture and the position of the pointer 52 at that time.

Figure 6:
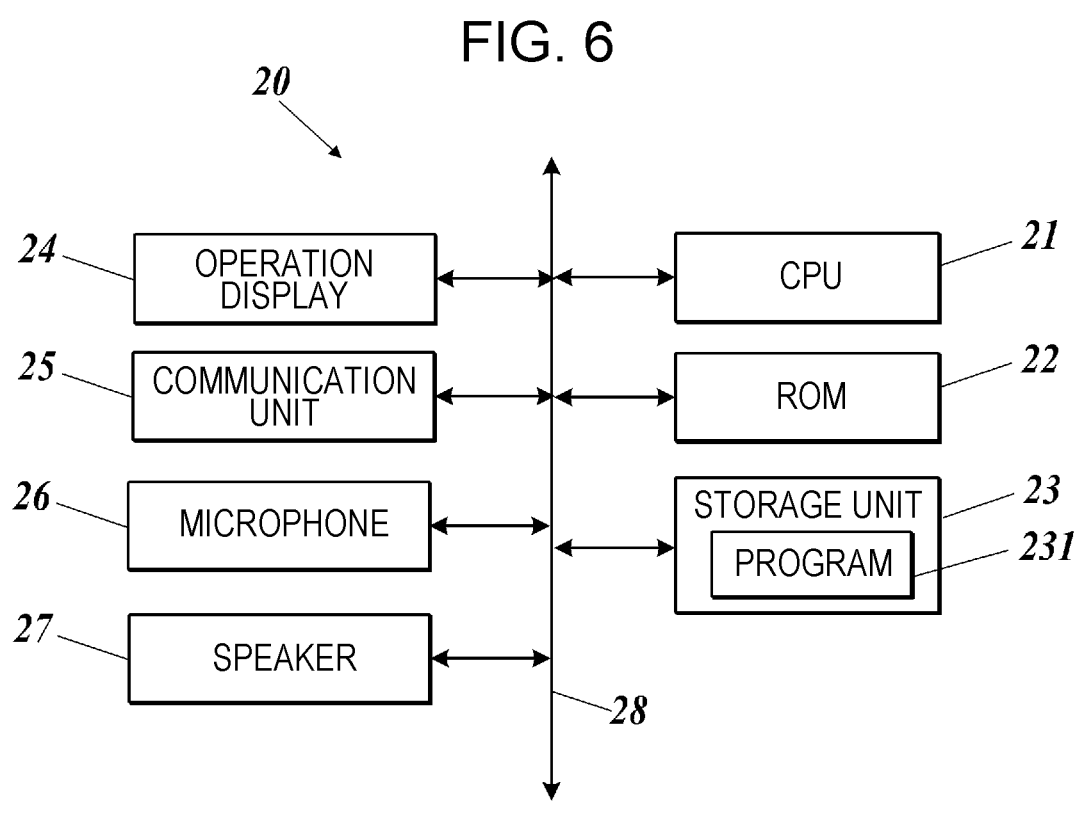
FIG. 6 is a block diagram illustrating the main functional configuration of an external device.

As illustrated in FIG. 6, each external device 20 includes a CPU 21, a RAM 22, a storage unit 23, an operation display 24, a communication unit 25, a microphone 26, and a speaker 27, and these components are connected to each other by a bus 28.

The CPU 21 is a processor that performs various arithmetic operations and performs overall control of the operation of the various parts of the external device 20. The CPU 21 reads out and executes a program 231 stored in storage unit 23 in order to perform various control operations.

The RAM 22 provides a working memory space for the CPU 21 and stores temporary data.

The storage unit 23 is a non-transitory recording medium that can be read by the CPU 21 serving as a computer. The storage unit 23 stores the program 231 executed by the CPU 21 and various settings data. The program 231 is stored in storage unit 23 in the form of computer-readable program code. For example, a nonvolatile storage device such as an SSD containing a flash memory or a hard disk drive (HDD) can be used as the storage unit 23.

The operation display 24 includes a display device such as a liquid crystal display and input devices such as a mouse and keyboard. The operation display 24 displays various information about the display system 1, such as operating status and processing results, on the display device. The display includes, for example, an instructor screen 42 that includes an image of the visible area 41 captured by the camera 154 of the wearable terminal device 10. The content of the instructor screen 42 will be described in detail later. The operation display 24 converts operations input to the input devices by the user into operation signals and outputs the operation signals to the CPU 21.

The communication unit 25 transmits data to and receives data from the wearable terminal device 10 in accordance with a prescribed communication protocol. The communication unit 25 also communicates speech data to and from the wearable terminal device 10. In other words, the communication unit 25 transmits speech data collected by the microphone 26 to the wearable terminal device 10 and receives speech data transmitted from the wearable terminal device 10 in order to output speech from the speaker 27. The communication unit 25 may also be capable of communicating with devices other than the wearable terminal device 10.

The microphone 26 converts sound, such as the voice of a remote instructor, into electrical signals and outputs the electrical signals to the CPU 21.

The speaker 27 converts the input speech data into mechanical vibrations and outputs the mechanical vibrations as sound.

Next, operation of the display system 1 will be described focusing on operations relating to remote instruction (remote assistance) from a remote instructor operating the external device 20 to a user wearing the wearable terminal device 10.

In the display system 1 of this embodiment, bi-directional data communication can be performed between the wearable terminal device 10 and one or more external devices 20 to allow sharing of various data and collaborative work. For example, data of the images being captured by the camera 154 of the wearable terminal device 10 can be transmitted to the external device 20 and displayed on the operation display 24, and in this way, the remote instructor is able to perceive in real time what the user of the wearable terminal device 10 is seeing. The speech collected by the microphone 17 of the wearable terminal device 10 and the microphone 26 of the external device 20 can be transmitted via bidirectional speech data communication in order to carry out a voice call. Therefore, the period during which speech data communication is being performed by the wearable terminal device 10 and the external device 20 includes a period during which the user of the wearable terminal device 10 and the remote instructor are carrying out a voice call. Three or more people, including the user of the wearable terminal device 10 and two or more remote instructors operating two or more external devices 20, can share camera images and take part in a voice call. The remote instructors can provide instructions and assistance to the user of the wearable terminal device 10 via a voice call while viewing the real-time camera images.

In addition, the external device 20 can also instruct the wearable terminal device 10 to display the instructional images 31. In other words, the remote instructors can perform prescribed operations on the external devices 20 in order to cause the display 14 of the wearable terminal device 10 to display the instructional images 31.

Figure 7:
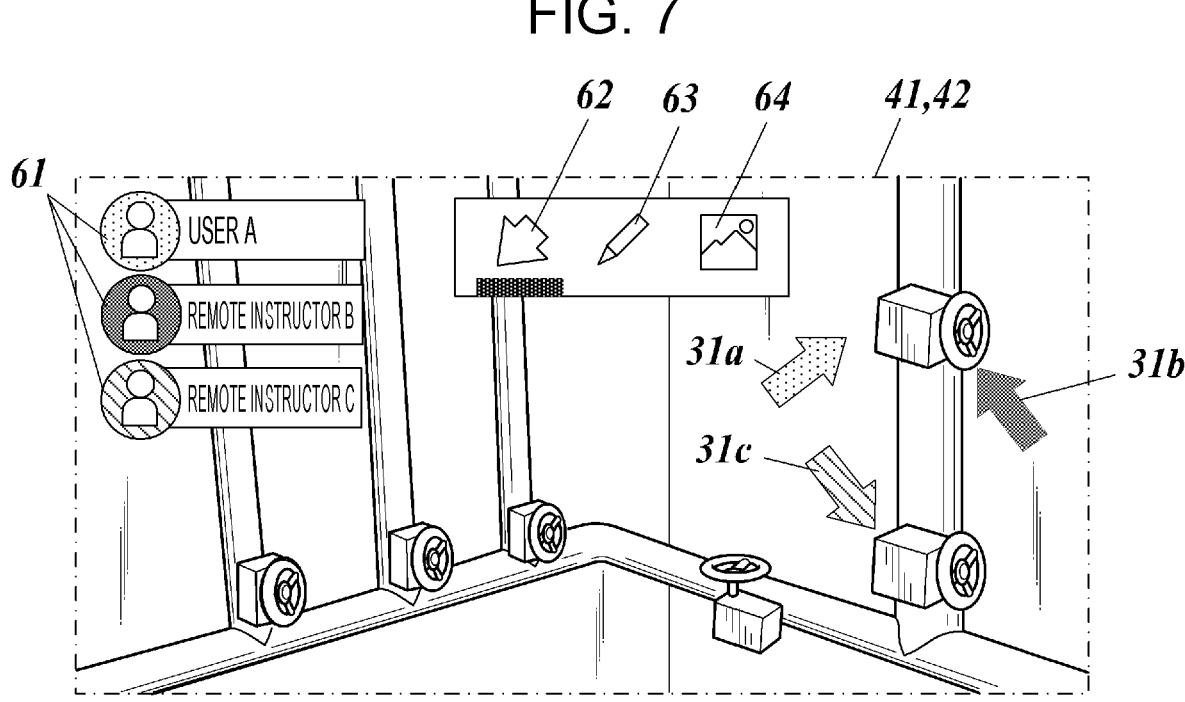
FIG. 7 is a diagram illustrating a visible area and an instructor screen when a remote instruction operation is being performed.

FIG. 7 illustrates a case in which camera images are shared and a voice call is made by the user A of the wearable terminal device 10 and remote instructors B and C, who operate different external devices 20. FIG. 7 illustrates the visible area 41 for the user A at a certain point in time and the instructor screen 42 displayed on the two external devices 20. The instructor screen 42 is displayed based on the data captured by the camera 154 transmitted from the wearable terminal device 10, and usually reflects the visible area 41 for the user A as it is. The visible area 41 and the instructor screen 42 in FIG. 7 include the handles of valves serving as work objects. A case in which the user A of the wearable terminal device 10 receives instructions and assistance from the remote instructors B and C regarding work involving a handle will be described as an example.

Instructional images 31a to 31c that are arrows are displayed in the visible area 41 and the instructor screen 42 in FIG. 7. The instructional image 31a is displayed based on an instruction given by the user A accepted in the wearable terminal device 10. The instructional image 31b is displayed based on an instruction given by the remote instructor B accepted in one external device 20. The instructional image 31c is displayed based on an instruction given by the remote instructor C accepted in the other external device 20. Thus, the user A of the wearable terminal device 10 can also instruct display of the instructional images 31. In other words, both the user A and the remote instructors B and C are a form of instructor who may instruct the display of instructional images. Hereinafter, the user A and either one of the remote instructors B and C will also be simply referred to as "instructor". The user A may display the instructional image 31a, for example, in order to point to a position to confirm a work position in response to instructions from the remote instructors B and C using the instructional images 31b and 31c.

Stated another way, the CPU 11 of the wearable terminal device 10 causes the display 14 to display the instructional images 31 located in the space 40 based on instructions from the instructors. Similarly, the CPU 21 of each external device 20 causes the operation display 24 to display instructional images 31 located inside the space 40 based on instructions from the instructors.

However, there is an issue in that when multiple instructors each display instructional images 31, if the display modes (colors, and so on) used by the instructors are identical, which instructional image 31 has been displayed in response to instruction by which instructor will be impossible to grasp.

Accordingly, the CPU 11 of the wearable terminal device 10 in this embodiment causes the display 14 to display the multiple instructional images 31a to 31c based on the instructions of multiple instructors using a different display mode for each instructor who gave an instruction. Specifically, the CPU 11 causes the display 14 to display the multiple instructional images 31a to 31c in a different color for each instructor who gave an instruction. Similarly, the CPUs 21 of the external devices 20 cause the operation displays 24 to display the multiple instructional images 31a to 31c based on the instructions of multiple instructors in a different color for each instructor who gave an instruction. This enables easy and intuitive grasping of who instructed display of the instructional images 31a to 31c.

The CPU 11 also causes the display 14 to display the instructional images 31a to 31c during the execution of speech data communication via the communication unit 16.

The CPU 11 associates different colors (display modes) with the user A and the remote instructors B and C who are taking part in a voice call using speech data communication, and causes the display 14 to display the instructional images 31a to 31c in the colors associated with the instructors who gave the instructions. In this way, a simple process can be used to display the instructional images 31a to 31c in a different color for each instructor. By displaying the instructional images 31a to 31c while the voice call is in progress, the user A is able to carry out the work in accordance with the instructions from the remote instructors B and C via a voice call while viewing the instructional images 31a to 31c.

More specifically, in voice communication, the user A and the remote instructors B and C are each associated with one of multiple user icons 61 (identification signs) that are different colors from each other. In the upper left corner of the visible area 41 and the instructor screen 42, the user icons 61 associated with the individual instructors are displayed together with the names of the instructors. The CPU 11 causes the display 14 to display the instructional images 31 in the colors of the user icons 61 associated with the instructors who gave the instructions. Therefore, for one instructor, the color of the user icon 61 associated with that instructor is the same as the color of the instructional image 31 displayed based on an instruction from that instructor. This enables easy and intuitive grasping of which instructor instructed display of each of the instructional images 31a to 31c.

An arrow icon 62, a pen input icon 63, and an image icon 64 are displayed in the upper part of the visible area 41 and the instructor screen 42. An instructional image 31 of an arrow can be generated and displayed by performing a prescribed operation while the arrow icon 62 is selected, as illustrated in FIG. 7. Thus, the instructional images 31 may include images of virtual objects, and the virtual objects may include an arrow-shaped object (arrow) having a specified position and orientation.

Figure 8:
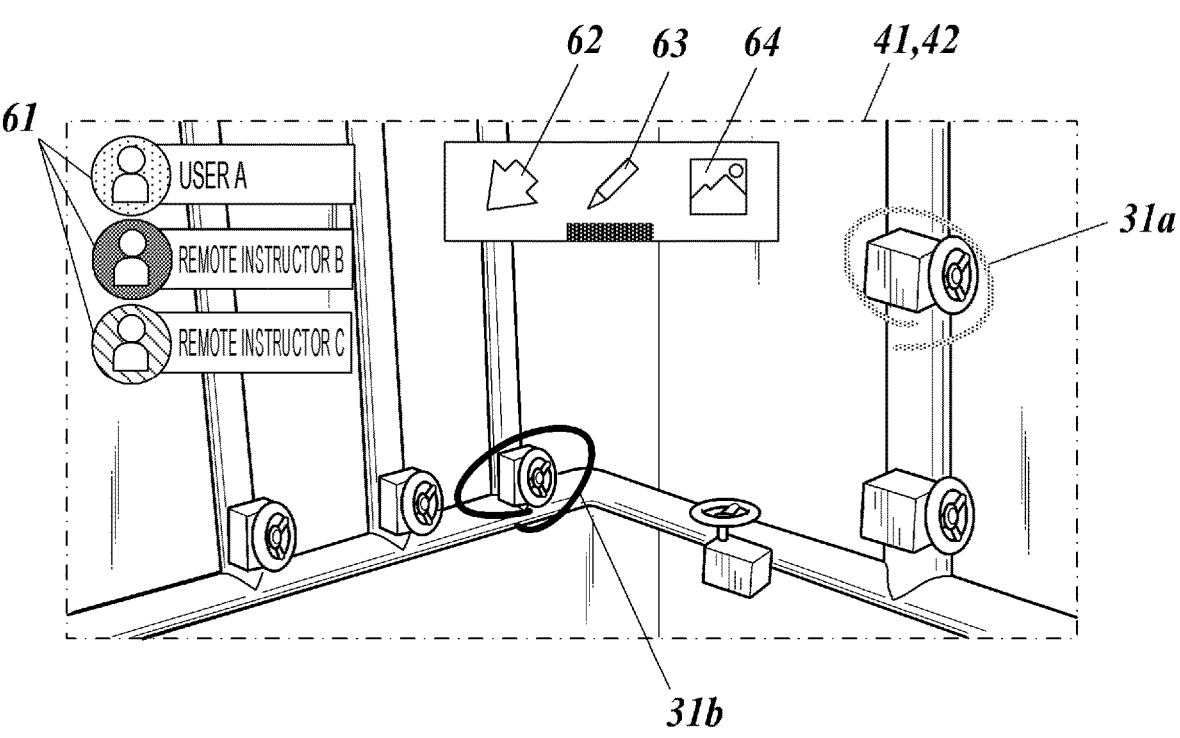
FIG. 8 is a diagram illustrating a visible area and an instructor screen when an instructional image representing a path traced by pen input is displayed.

As illustrated in FIG. 8, an instructional image 31 of a path traced by pen input can be generated and displayed by performing a prescribed operation while the pen input icon 63 is selected. Thus, the virtual objects serving as instructional images 31 may also include an object representing a path traced by pen input. An object representing a path traced by pen input may be, for example, handwritten characters or a drawing. The path traced by pen input may be identified from detection results of a path traced by the user's fingertip, or based on the path of movement of the tip of a prescribed pen input device held by the user or remote instructor.

The instructional image 31a in FIG. 8 is displayed based on an instruction given by the user A accepted in the wearable terminal device 10. The instructional image 31b is displayed based on an instruction given by the remote instructor B accepted in one external device 20. As illustrated in FIG. 8, the instructional images 31a and 31b of paths traced by pen input are displayed in a different color for each instructor who gave an instruction. For each instructor, the same color may be used for the instructional image 31 of a path traced by pen input and the user icon 61.

Figure 9:
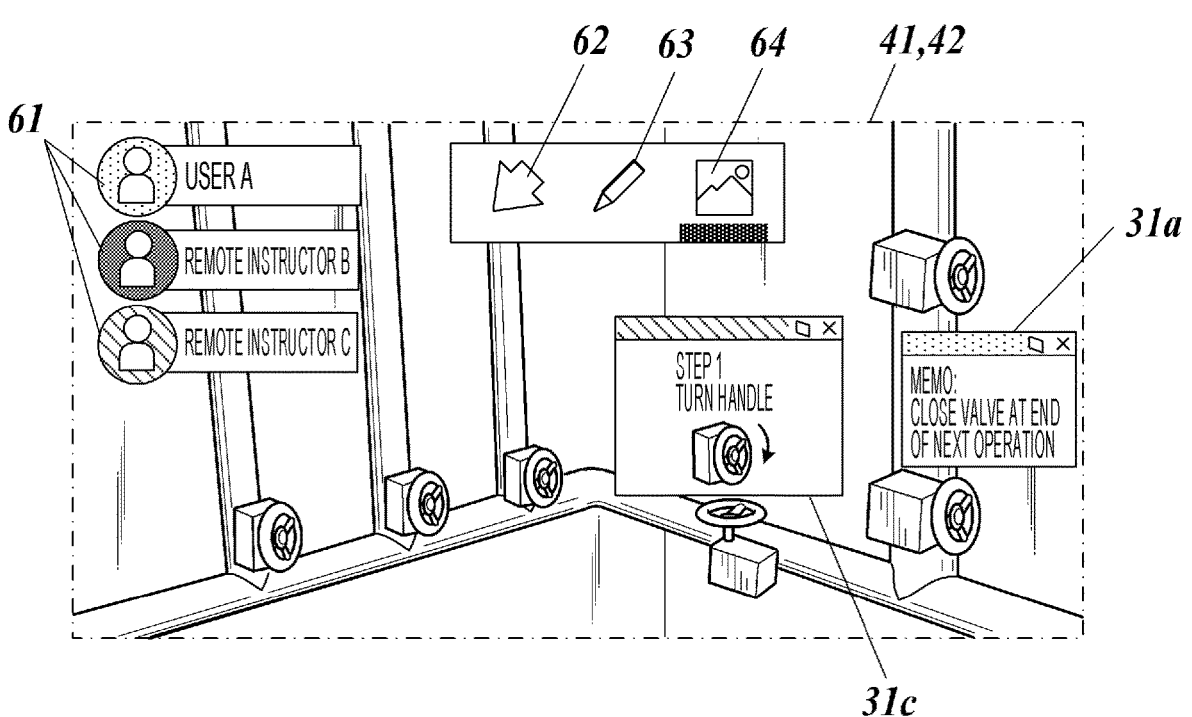
FIG. 9 is a diagram illustrating a visible area and an instructor screen when an instructional image that is a document image is displayed.

As illustrated in FIG. 9, an instructional image 31 that is a document image can be generated and displayed by performing a prescribed operation while the image icon 64 is selected. Thus, the instructional images 31 may include document images in a prescribed file format. The document images are, for example, displayed as window screens, as illustrated in FIG. 9. The document images may be instructions or a manual illustrating steps for the work to be performed. The file format of the document images may be a file format relating to image data, such as JPEG, PDF, or a file format of any other file generated by software.

The instructional image 31a in FIG. 9 is displayed based on an instruction given by the user A accepted in the wearable terminal device 10. The instructional image 31c is displayed based on an instruction given by the remote instructor C accepted in one external device 20. As illustrated in FIG. 9, the instructional images 31a and 31c that are document images are displayed in a different color for each instructor who gave an instruction. Here, the function bars in the window screens of the instructional images 31a and 31c are given a different color for each instructor, but not limited to this, the colors of the backgrounds of the window screens may be made a different color each instructor. The colors of the instructional images 31 that are document images may be matched to the colors of the user icons 61 for the respective instructors.

Next, remote instruction processing for performing an operation of sharing the instructional image 31a as described above will be described while referring to FIGS. 10 and 11. In the flowchart in FIG. 10, the control procedure of the remote instruction processing executed by the CPU 21 in the external devices 20 and the control procedure of the remote instruction processing executed by the CPU 11 in the wearable terminal device 10 are illustrated in parallel. Here, a case in which, first, the instructional image 31b is instructed to be displayed in the external device 20 operated by the remote instructor B, and then the instructional image 31a is instructed to be displayed by the user A of the wearable terminal device 10 will be described as an example.

Figure 10:
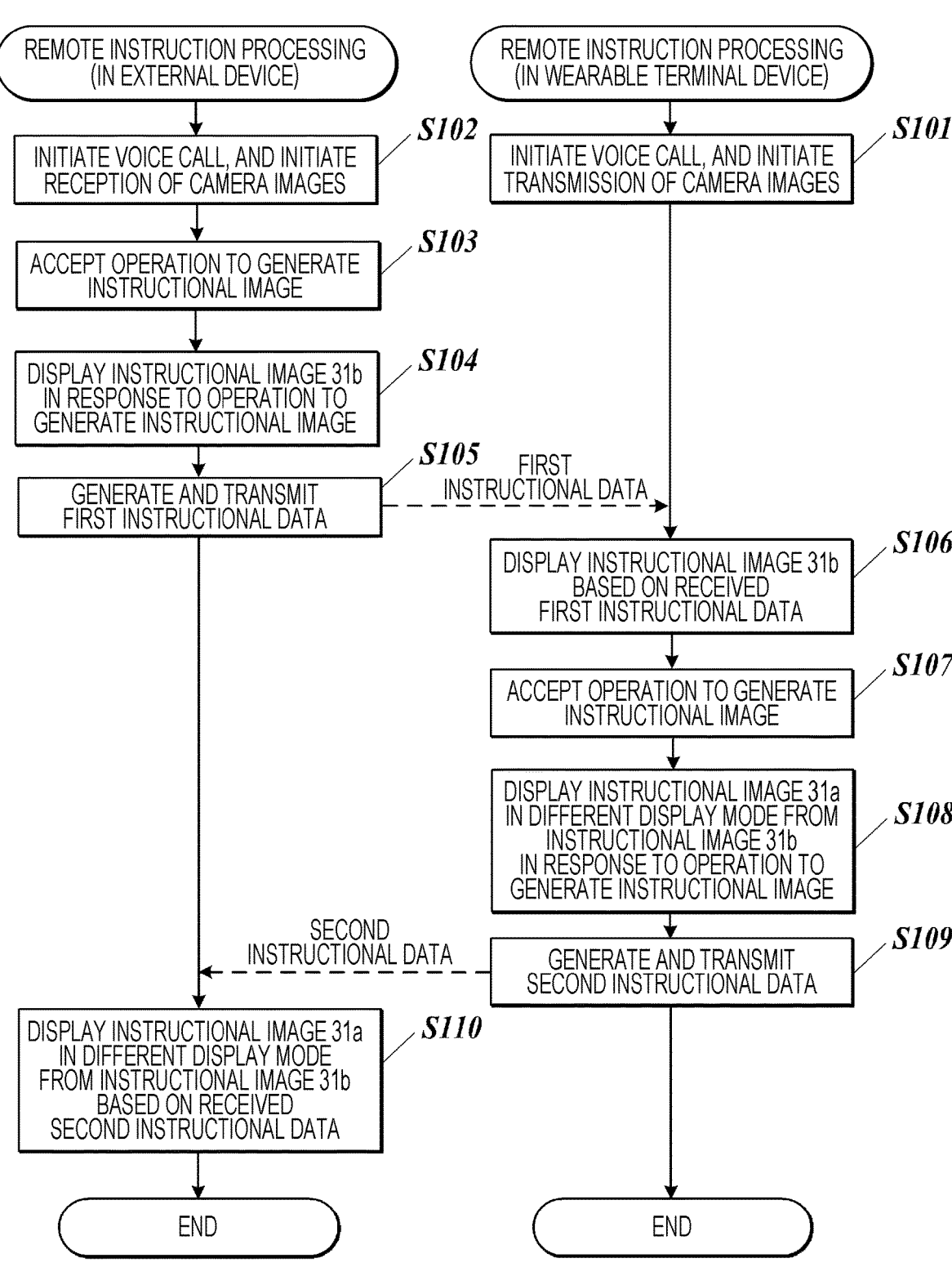
FIG. 10 is a flowchart illustrating the control procedure of remote instruction processing.

As illustrated in FIG. 10, when the remote instruction processing is initiated, the CPU 11 of the wearable terminal device 10 initiates speech data communication with the external device 20, thereby initiating a voice call. The CPU 11 also initiates transmission of camera images captured by the camera 154 to the external device 20 (Step S101).

When the remote instruction processing is initiated, the CPU 21 of the external device 20 initiates speech data communication with the wearable terminal device 10, thereby initiating a voice call. The CPU 21 also starts receiving camera images captured by the camera 154 of the wearable terminal device 10 (Step S102). After that, the CPU 21 displays the instructor screen 42 based on the camera images, and displays the camera images as a real-time moving image on the instructor screen 42.

The CPU 21 of the external device 20 accepts an operation performed by the remote instructor B for generating the instructional image 31b (hereinafter, referred to as "instructional image generation operation") (Step S103). The instructional image generation operation includes operations for specifying the size, color, display position, and orientation of the instructional image 31b on the instructor screen 42 and the visible area 41. While the instructional image generation operation is being accepted, the camera image on the instructor screen 42 may be paused and may be a still image.

Figure 11:
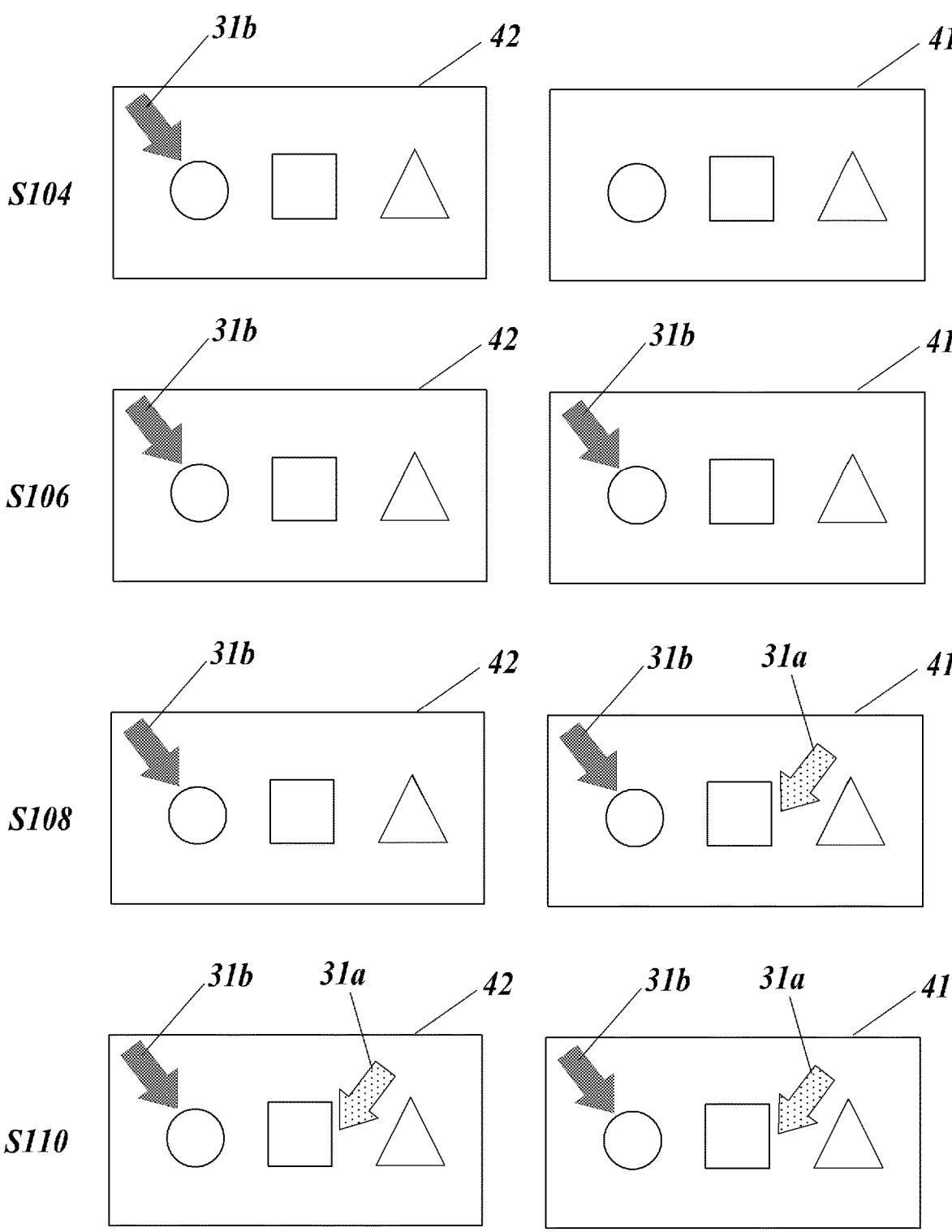
FIG. 11 is a diagram illustrating a visible area and an instructor screen in remote instruction processing.

The CPU 21 displays the instructional image 31b on the instructor screen 42 in accordance with the content of the instructional image generation operation (Step S104), as illustrated in S104 in FIG. 11.

The CPU 21 generates first instructional data for displaying the displayed instructional image 31b on the wearable terminal device 10 and transmits the data to the wearable terminal device 10 (Step S105).

When the CPU 11 of the wearable terminal device 10 receives the first instructional data, the CPU 11 displays the instructional image 31b on the visible area 41 of the display 14 based on the first instructional data (Step S106), as illustrated in S106 in FIG. 11. In more detail, first, the CPU 11 generates the virtual image data 132 relating to the instructional image 31b based on the first instructional data. The CPU 11 displays the instructional image 31b at the display position specified by the virtual image data 132 in the space 40 based on the generated virtual image data 132. In more detail, the CPU 11 causes the display 14 to display the instructional image 31b when the display position of the instructional image 31b is inside the visible area 41. This allows the remote instructor B to display the instructional image 31b with content desired by the remote instructor B at a position intended by the remote instructor B, and the user A of the wearable terminal device 10 is able to see and share the instructional image 31b.

The CPU 11 accepts an instructional image generation operation from the user A (Step S107).

As illustrated in S108 in FIG. 11, the CPU 11 causes the instructional image 31a to be displayed in a different display mode (in this case, in a different color) from the instructional image 31b in the visible area 41 of the display 14 (Step S108) in accordance with the content of the instructional image generation operation. Here, the CPU 11 determines the color of the instructional image 31a and displays the instructional image 31a so that the color of the instructional image 31a is different from that of the instructional image 31b. In other words, when an instruction to display the instructional image 31a is given by the user A, if the instructional image 31b is already displayed based on an instruction from another instructor, the CPU 11 causes the display 14 to display the new instructional image 31a in a different display mode from that of the already displayed instructional image 31b, regardless of whether or not an operation specifying the display mode is performed by the user A. This allows the instructional images 31 to be displayed in a different display mode for each instructor even if the instructors do not specifically intend to do so.

The CPU 11 generates second instructional data for displaying the displayed instructional image 31a on the external device 20 and transmits the second instructional data to the external device 20 (Step S109).

The CPU 21 of the external device 20 displays the instructional image 31a on the instructor screen 42 in a different display mode (in this case, in a different color) than the instructional image 31b (Step S110), based on the received second instructional data, as illustrated in S110 in FIG. 11. The color of the instructional image 31a may be specified in the second instructional data, or the CPU 21 may specify a different color for the instructional image 31b on the instructor screen 42.

Once Steps S109 and S110 are finished, the CPUs 11 and 21 terminate the remote instruction processing.

Next, variations of the above-described embodiment will be described. In the following variations, differences from the above embodiment will be described and description of content that is shared by the above embodiment will be omitted. Each of the following variations may be combined with any other variation.

[Variation 1]

In the above embodiment, the CPU 11 or CPU 21 automatically sets the display modes of the instructional images 31 so as to be different for each instructor, but alternatively, the instructional images 31 may be displayed in display modes selected by the instructors.

Figure 12:
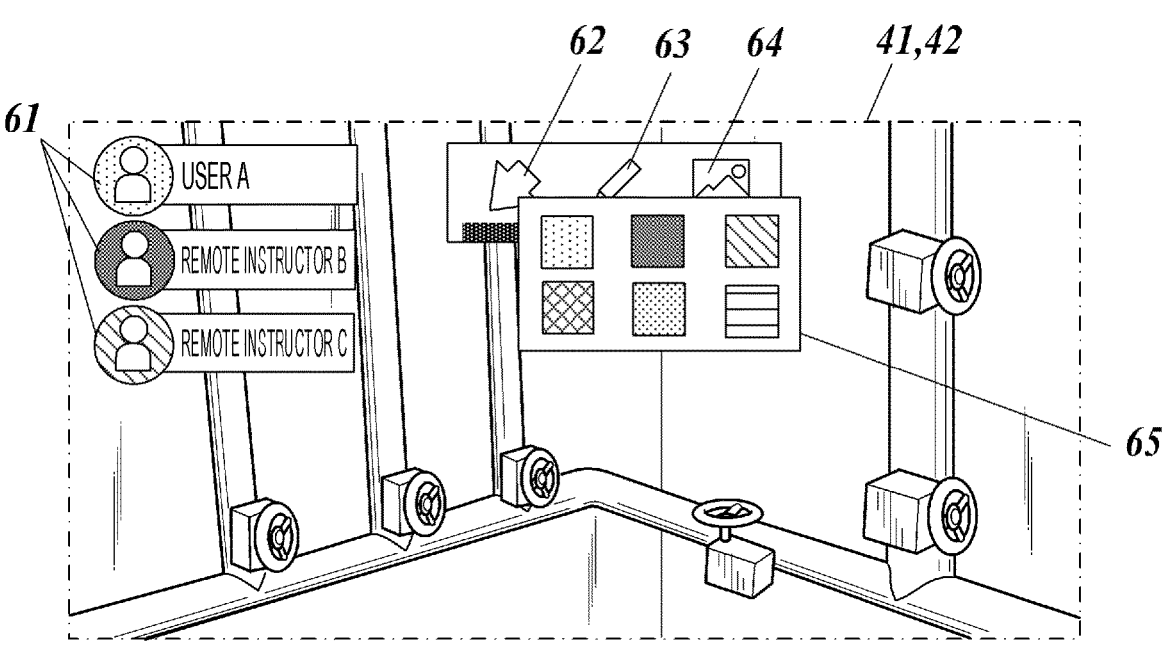
FIG. 12 is a diagram illustrating a visible area and an instructor screen when a color palette is displayed.

For example, as illustrated in FIG. 12, a color palette 65 may be displayed to allow selection of the colors of the instructional images 31 to be generated when the arrow icon 62, the pen input icon 63, or the image icon 64 is selected. FIG. 12 depicts the color palette 65 being displayed in response to selection of the arrow icon 62. The color palette 65 contains an array of multiple color icons whose colors differ from one another. When an instructional image 31 is instructed to be displayed with one of these color icons selected, an instructional image 31 of an arrow having the color of the selected color icon is generated and displayed. For example, when the above operation is accepted by the wearable terminal device 10, the CPU 11 displays the instructional image 31 of an arrow of the selected color in the visible area 41 of the display 14. Thus, the CPU 11 may accept an operation from an instructor to select one color from among multiple colors (multiple display modes) that can be selected, and display an instructional image 31 on the display 14 in the selected color. In this way, an instructional image 31 of a desired color can be displayed. When the above operation is accepted by the external device 20, the CPU 21 displays the instructional image 31 of an arrow of the selected color on the instructor screen 42.

Figure 13:
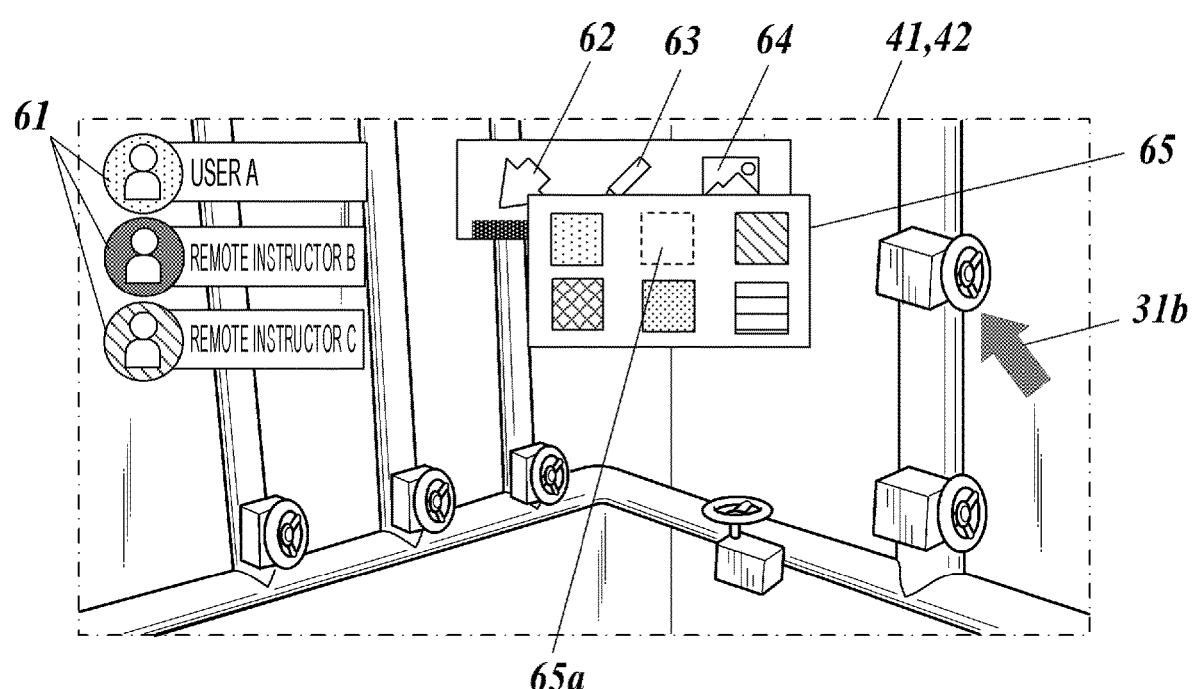
FIG. 13 is a diagram illustrating a color palette when there is an existing instructional image.

Here, as illustrated in FIG. 13, if the instructional image 31b is already displayed based on an instruction from another instructor when the user A of the wearable terminal device 10 selects a color from the color palette 65, a color icon 65a of the color of the already displayed instructional image 31b may be excluded from the color icons of the color palette 65. In other words, the multiple colors (multiple display modes) that may be selected from the color palette 65 may include colors other than the color of the instructional image 31b that is already displayed when an instructor makes a selection. A specific color may have already been selected at a point in time prior to the user A selecting a color using the color palette 65, and the specific color may be different from the color of the instructional image 31b that is already displayed. Thus, the instructional images 31 can be more reliably displayed in a different display mode for each instructor. Substantially the same operation may be performed in the external devices 20.

Figure 14:
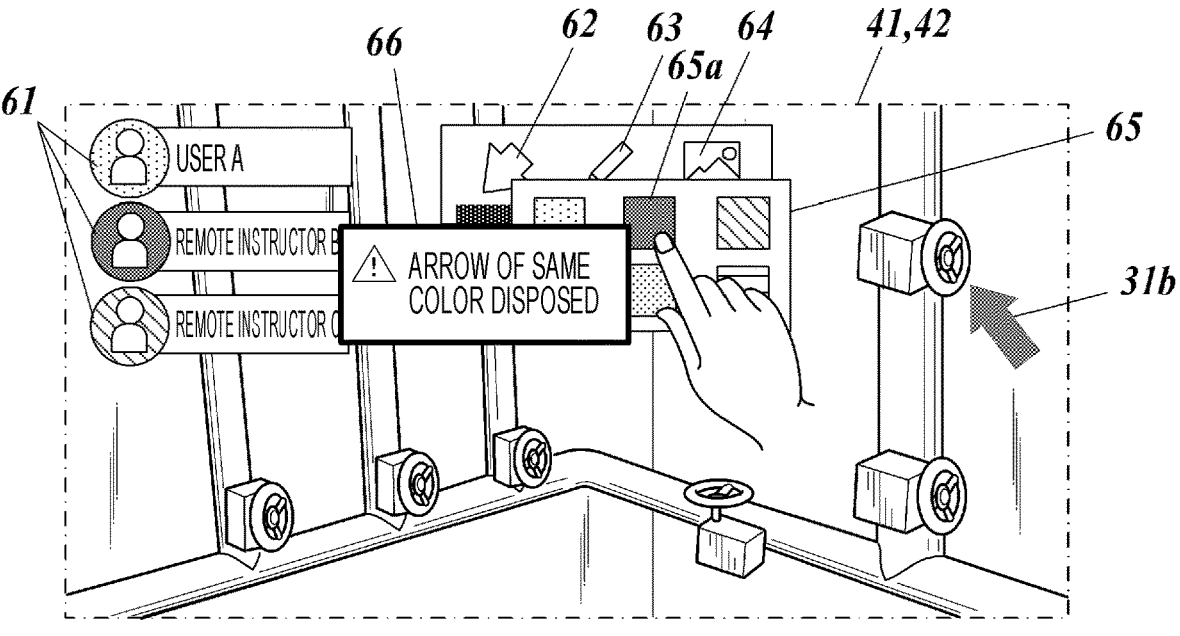
FIG. 14 is a diagram illustrating a notification display in response to an operation performed on a color palette.

As illustrated in FIG. 14, if the instructional image 31b is already displayed based on an instruction from another instructor, when the user A selects the color icon 65a, which is the same color as the instructional image 31b, a notification display 66 may be displayed. In other words, the CPU 11 may cause a prescribed notification display 66 to be displayed on the display 14, if an instructor attempts to select the color (display mode) of the instructional image 31b that is already displayed. Here, as illustrated in FIG. 14, the notification display 66 may be a text display indicating that an instructional image 31 of the same color has already been disposed. In this way, the occurrence of a problem in which the instructional image 31a is unintentionally displayed in the same display mode as the instructional image 31b displayed by another instructor can be reduced. As illustrated in FIG. 14, the CPU 11 may display the notification display 66 so as to be positioned closer to the user than the color palette 65 on the display 14 in the space 40. The CPU 11 may also determine the display mode of the notification display 66 based on the color of the user icon 61 associated with the user A. For example, the CPU 11 may perform control to make the outer frame of the notification display 66 illustrated in FIG. 14 (the frame portion represented by a bold line in the notification display 66) to be the same color as the user icon 61 associated with the user A. The CPU 11 may stop displaying the notification display 66 once a prescribed period of time has elapsed after displaying the notification display 66 on the display 14. When displaying the notification display 66, the CPU 11 may cause the speaker 27 to output a notification to the user to alert the user. The notification for alerting the user to be output from the speaker 27 is, for example, a message such as "an arrow of the same color is disposed", a buzzer sound such as a beep, and so on. Substantially the same operation may be performed in the external devices 20.

[Variation 2]

Figure 15:
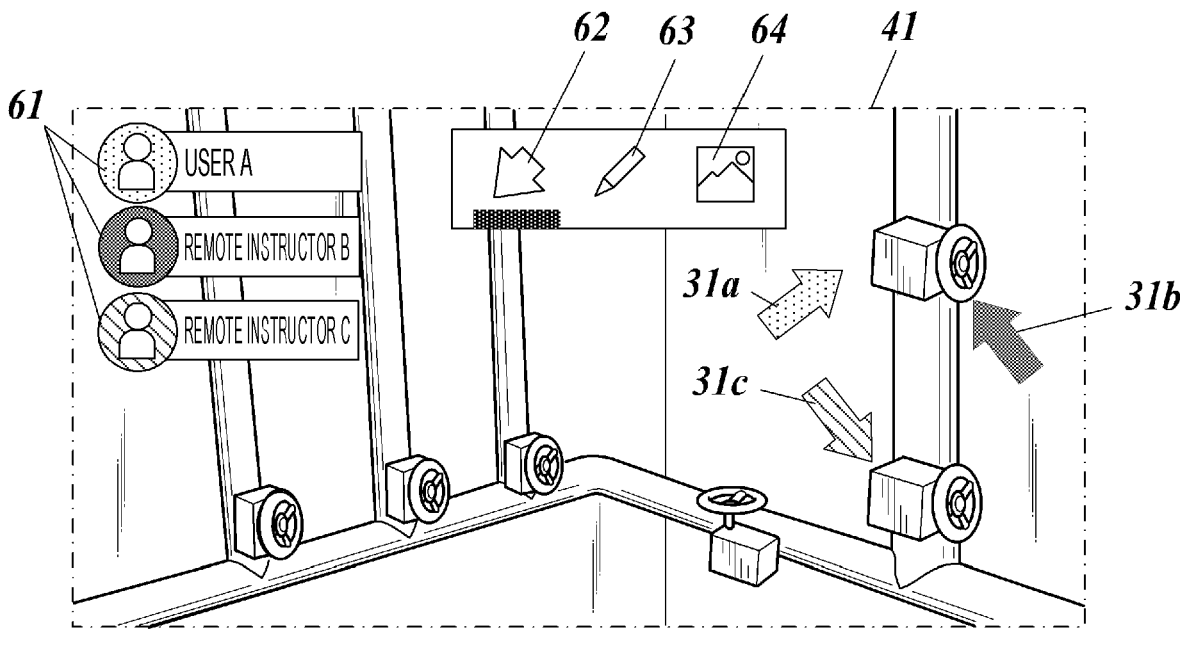
FIG. 15 is a diagram illustrating another example of a display mode of an instructional image in a visible area and an instructor screen.
Figure 15:
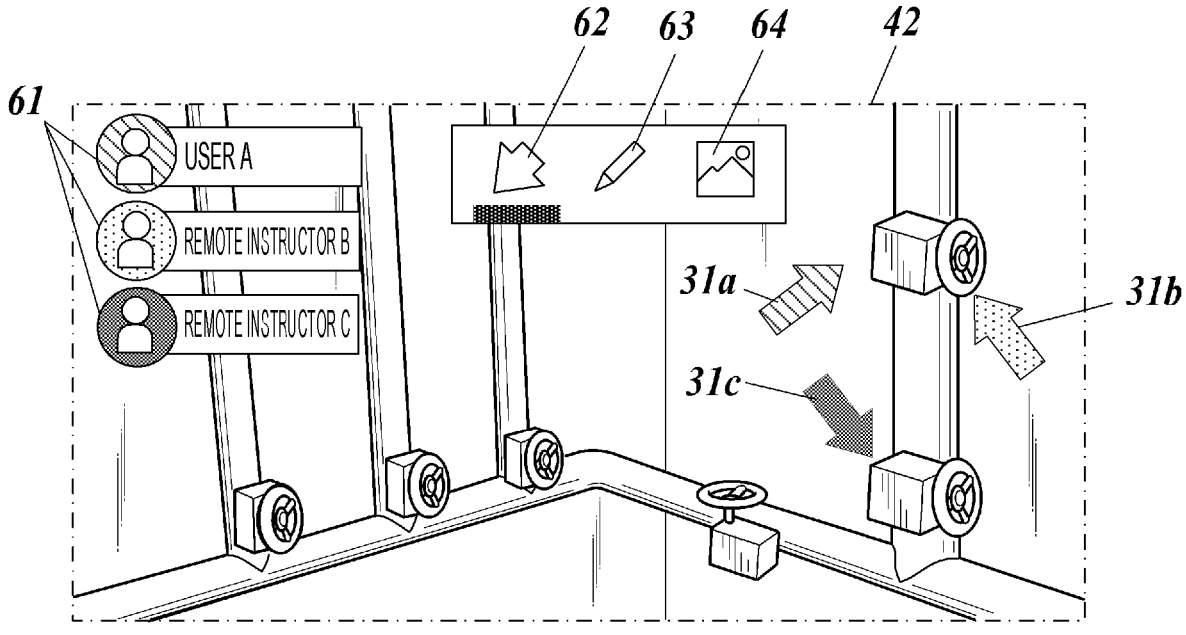

In the above embodiment, the display mode of the same instructional image 31 is the same in the visible area 41 of the wearable terminal device 10 and in the instructor screen 42 of the external device 20, but the display mode does not need to be the same. For example, as illustrated in FIG. 15, the display mode (in this case, color) of the same instructional image 31 may be different in the visible area 41 and in the instructor screen 42. In other words, the display modes of multiple instructional images 31 based on the instructions of multiple instructors in the wearable terminal device 10 may be defined independently of the display modes of multiple instructional images 31 in the external devices 20. The color of the user icons 61 associated with the individual instructors may also be independently defined for each of the wearable terminal device 10 and the external devices 20. In this way, the degree of freedom when selecting the display modes for the wearable terminal device 10 and the external devices 20 can be increased.

[Variation 3]

Figure 16:
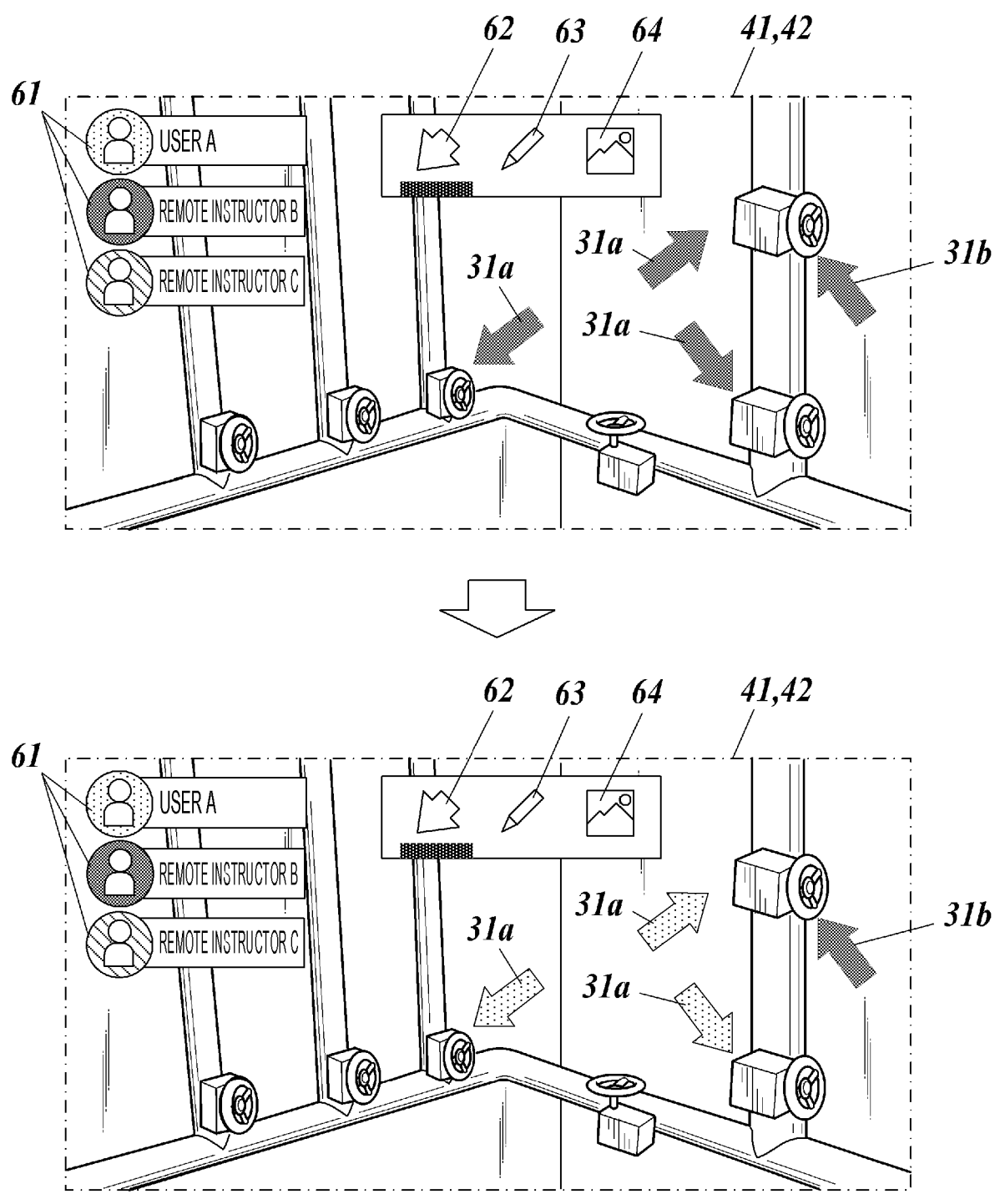
FIG. 16 is a diagram illustrating another example of a display operation of an instructional image in a visible area and an instructor screen.

In the above embodiment, when the instructional images 31 are displayed, the display modes are defined and displayed so that a different display mode is used for each instructor. In other words, the display modes of the instructional images 31 are individually defined for each instructional image 31. However, this does not need to be the case. For example, as illustrated in FIG. 16, after displaying the instructional images 31 in any color (any display mode) on the display 14, the CPU 11 may change the color of the instructional images 31 that are displayed so that the multiple instructional images 31 based on the instructions of multiple instructors are displayed in a different color (display mode) for each instructor who has given an instruction. In the example in FIG. 16, in the upper part of the figure, the instructional images 31a, based on instructions from the user A, are initially displayed in the same color as the existing instructional image 31b. After that, as illustrated in the lower part of the figure, at a prescribed timing, the color of the instructional images 31a is changed so that different colors are used for the instructional images 31a and 31b for each instructor. The timing at which the colors of the instructional images 31 are changed as in the lower part the figure can be, for example, when a series of jobs relating to the instructional images 31 is completed, when a joint editing process relating to the instructional images 31 is completed, or when data relating to the instructional images 31 is saved. Substantially the same operation may be performed in the external devices 20.

[Variation 4]

Figure 17:
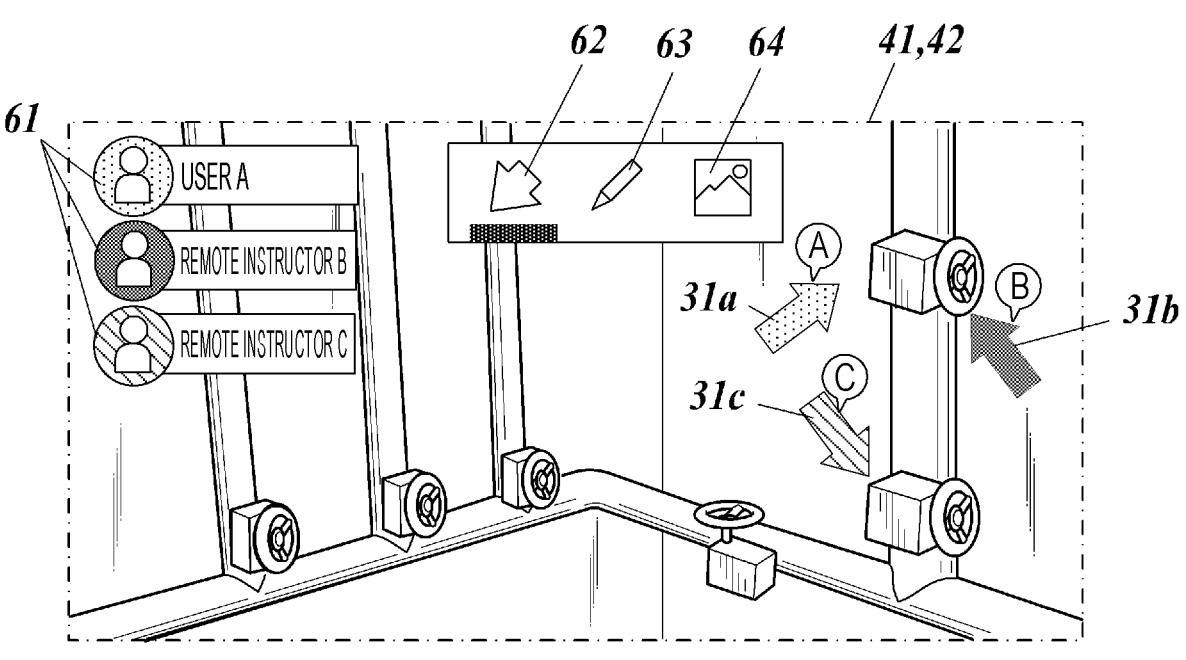
FIG. 17 is a diagram illustrating an example in which different characters are added to the instructional images for each instructor.

The above embodiment has been described using an example in which different colors are used for the instructional images 31 for each instructor as a display mode of the instructional images 31 that differs each instructor, but the present disclosure is not limited to this example. For example, as illustrated in FIG. 17, the CPU 11 may add different characters or symbols to the displays of multiple instructional images 31 based on instructions from multiple instructors, with different characters or symbols being used for the different instructors who gave the instructions. The additional characters may include the name, alias, or abbreviated name of the instructor who gave the instruction. The method of adding the characters or symbols may be disposing the characters or symbols in the vicinity of the instructional images 31. The method may be drawing a line extending from each of the instructional images 31 and displaying the characters or symbols at the end of the extending line. In this way, who instructed display of each instructional image 31 can be clearly grasped. In FIG. 17, the colors of the instructional images 31 are made different from each other for the individual instructors while adding characters or symbols. However, this method does not necessarily need to be used, and the same color may be used for the instructional images 31 and the instructional images 31 may be distinguished from each other by characters or symbols.

The CPU 11 may add characters or symbols to the displays of instructional images 31 when the distance between the position of the user A in the space 40 and the display positions of the instructional images 31 is less than or equal to a prescribed reference distance. In this way, who instructed display of an instructional image 31 that is close to the work object of the user A can be clearly indicated while avoiding a situation where the display becomes complex.

Figure 18:
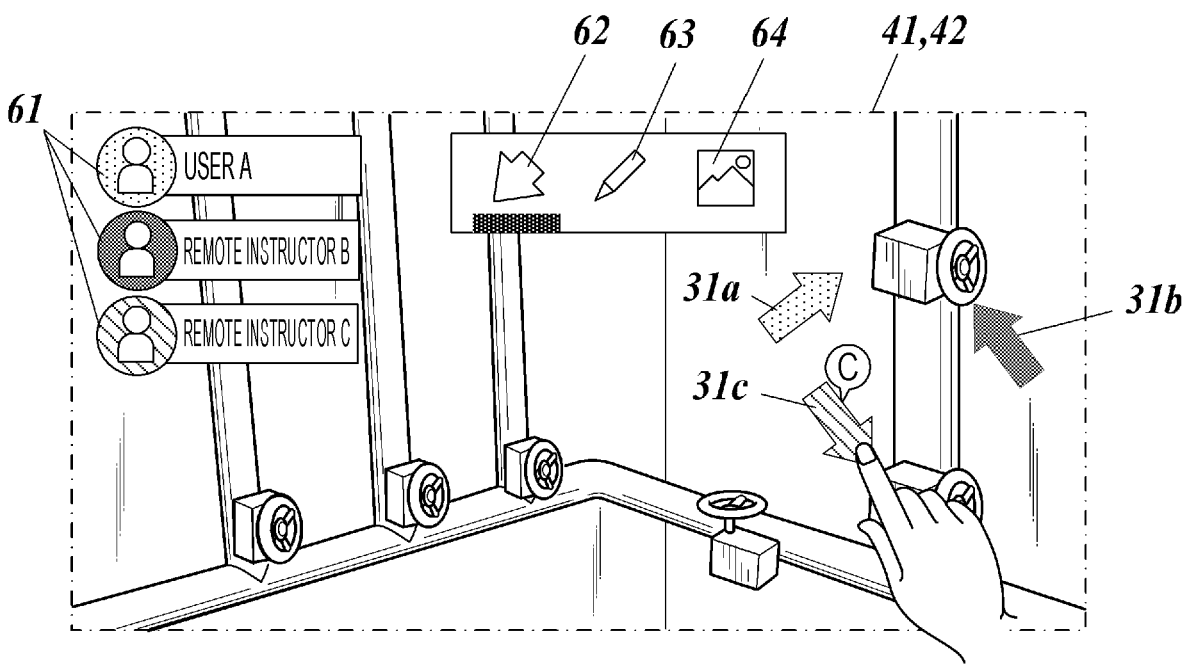
FIG. 18 is a diagram illustrating an example of a manner in which characters are added to an instructional image.

As illustrated in FIG. 18, the CPU 11 may add characters or symbols to the display of an instructional image 31 when a prescribed operation is performed on the instructional image 31. In FIG. 18, an operation of tapping a finger on an instructional image 31 is illustrated as an example of the prescribed operation, but the prescribed operation is not limited to a finger tap and may be, for example, an operation of making a selection using the pointer 52. In this way, who instructed display of an instructional image 31 can be clearly indicated as desired by the user A while avoiding a situation where the display becomes complex.

The display modes of the instructional images 31, which differ for the individual instructors, are not limited to changes in color and the addition of characters or symbols as described above, and can be any display modes that allow the instructional images 31 to be distinguished from each other.

Second Embodiment

Next, the configuration of a display system 1 according to a Second Embodiment will be described. The Second Embodiment differs from the First Embodiment in that an external information processing apparatus 80 executes part of the processing that is executed by the CPU 11 of the wearable terminal device 10 in the First Embodiment. Hereafter, differences from the First Embodiment will be described, and description of common points will be omitted.

Figure 19:
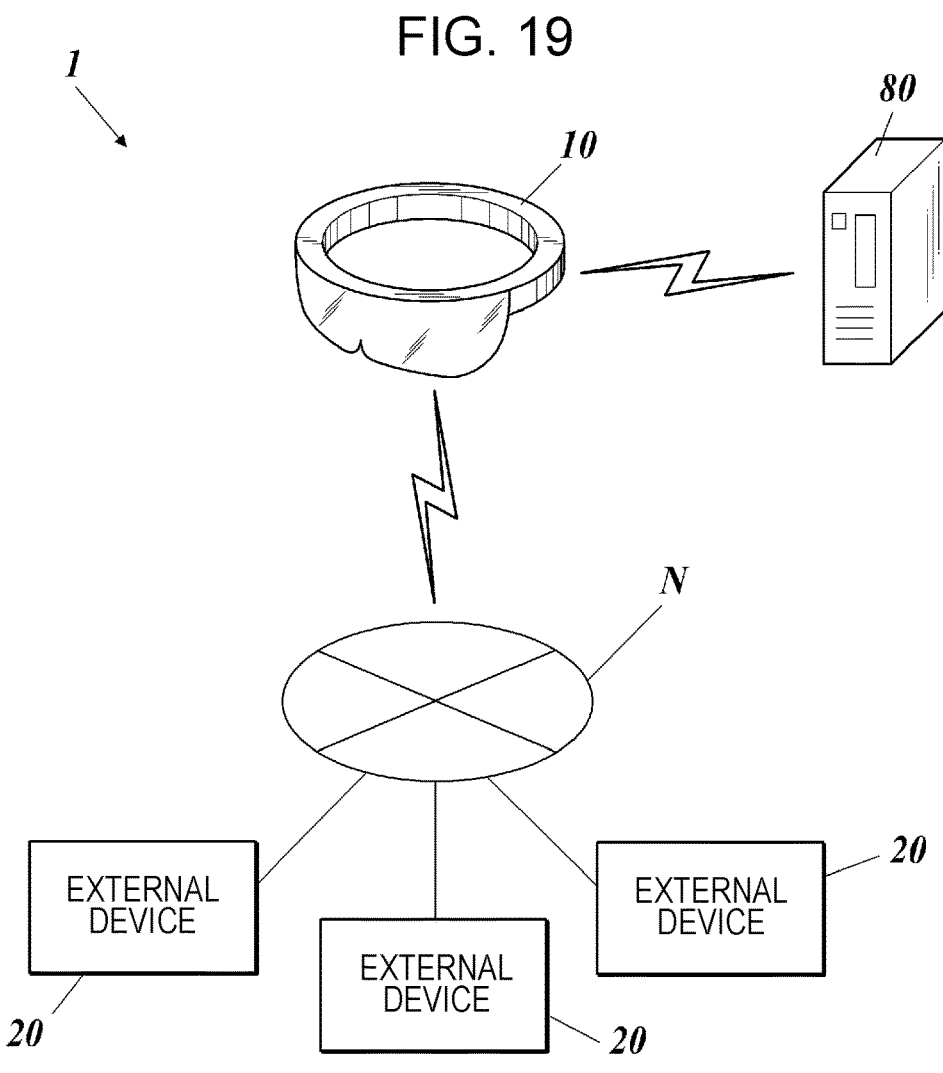
FIG. 19 is a schematic diagram illustrating the configuration of a display system according to a Second Embodiment.

As illustrated in FIG. 19, the display system 1 includes the wearable terminal device 10, multiple external devices 20, and the information processing apparatus 80 (server) connected to the wearable terminal device 10 so as to be able to communicate with the wearable terminal device 10. At least part of a communication path between the wearable terminal device 10 and the information processing apparatus 80 may be realized by wireless communication. The hardware configuration of the wearable terminal device 10 can be substantially the same as in the First Embodiment, but the processor for performing the same processing as that performed by the information processing apparatus 80 may be omitted.

Figure 20:
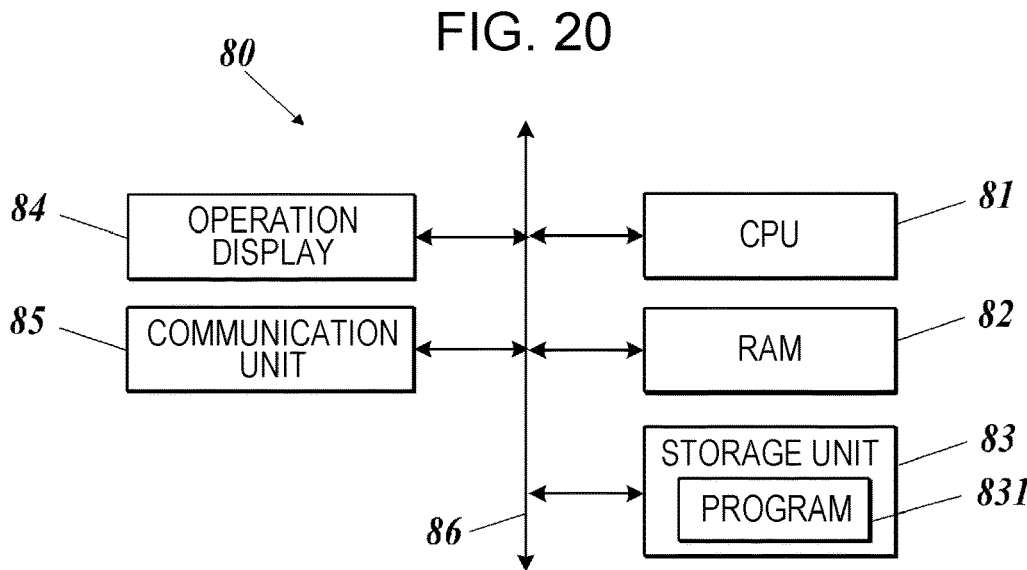
FIG. 20 is a block diagram illustrating the main functional configuration of an information processing apparatus.

As illustrated in FIG. 20, the information processing apparatus 80 includes a CPU 81, a RAM 82, a storage unit 83, an operation display 84, and a communication unit 85, which are connected to each other by a bus 86.

The CPU 81 is a processor that performs various arithmetic operations and controls overall operation of the various parts of the information processing apparatus 80. The CPU 81 reads out and executes a program 831 stored in storage unit 83 in order to perform various control operations.

The RAM 82 provides a working memory space for the CPU 81 and stores temporary data.

The storage unit 83 is a non-transitory recording medium that can be read by the CPU 81 serving as a computer. The storage unit 83 stores the program 831 executed by the CPU 81 and various settings data. The program 831 is stored in storage unit 83 in the form of computer-readable program code. For example, a nonvolatile storage device such as an SSD containing a flash memory or a HDD can be used as the storage unit 83.

The operation display 84 includes a display device such as a liquid crystal display and input devices such as a mouse and keyboard. The operation display 84 displays various information about the display system 1, such as operating status and processing results, on the display device. Here, the operating status of the display system 1 may include real-time images captured by the camera 154 of the wearable terminal device 10. The operation display 84 converts operations input to the input devices by the user into operation signals and outputs the operation signals to the CPU 81.

The communication unit 85 communicates with the wearable terminal device 10 and transmits data to and receives data from the wearable terminal device 10. For example, the communication unit 85 receives data including some or all of the detection results produced by the sensor unit 15 of the wearable terminal device 10 and information relating to user operations (gestures) detected by the wearable terminal device 10. The communication unit 85 may also be capable of communicating with devices other than the wearable terminal device 10 such as the external devices 20.

In the thus-configured display system 1, the CPU 81 of the information processing apparatus 80 performs at least part of the processing that the CPU 11 of the wearable terminal device 10 performs in the First Embodiment. For example, the CPU 81 may perform three-dimensional mapping of the space 40 based on detection results from the depth sensor 153. The CPU 81 may detect the visible area 41 for the user in the space 40 based on detection results produced by each part of the sensor unit 15. The CPU 81 may generate virtual image data 132 relating to a virtual image 30 (instructional image 31) in response to an operation performed by the user of the wearable terminal device 10 or based on instructional data received from the external device 20. The CPU 81 may also detect the position and orientation of the user's hand (and/or fingers) based on images captured by the depth sensor 153 and the camera 154.

The results of the above processing performed by the CPU 21 are transmitted to wearable terminal device 10 via the communication unit 25. The CPU 11 of the wearable terminal device 10 causes the individual parts of the wearable terminal device 10 (for example, display 14) to operate based on the received processing results. The CPU 81 may also transmit control signals to the wearable terminal device 10 in order to control display of the display 14 and/or control output of the speaker 18 of the wearable terminal device 10.

Thus, as a result of executing at least part of the processing in the information processing apparatus 80, the configuration of the wearable terminal device 10 can be simplified and manufacturing costs can be reduced. In addition, using the information processing apparatus 80, which has a higher performance, allows various types of processing related to MR to be made faster and more precise. Thus, the precision of 3D mapping of the space 40 can be increased, the quality of display performed by the display 14 can be improved, and the reaction speed of the display 14 to operations performed by the user can be increased.

(Other Considerations)

The above embodiments are illustrative examples, and may be changed in various ways.

For example, in each of the above embodiments, the visor 141 that is transparent to light was used to allow the user to see the real space, but this configuration does not necessarily need to be adopted. For example, a visor 141 that blocks light may be used and the user may be allowed to see an image of the space 40 captured by the camera 154. In other words, the CPU 11 may cause the display 14 to display an image of the space 40 captured by the camera 154 and the virtual images 30 superimposed on the image of the space 40. With this configuration, MR, in which the virtual images 30 are merged with the real space, can be realized.

In addition, VR can be realized in which the user is made to feel as though he or she is in a virtual space by using images of a pre-generated virtual space instead of images captured in the real space by the camera 154. In this VR as well, the visible area 41 for the user is identified, and the part of the virtual space that is inside the visible area 41 and the virtual images 30 whose display positions are defined as being inside the visible area 41 are displayed. Therefore, similarly to as in each of the above embodiments, a display operation can be applied in which the instructional images 31 are displayed in a different display mode for each instructor.

The wearable terminal device 10 does not need to include the ring-shaped body 10a illustrated in FIG. 1, and may have any structure so long as the wearable terminal device 10 includes a display that is visible to the user when worn. For example, a configuration in which the entire head is covered, such as a helmet, may be adopted. The wearable terminal device 10 may also include a frame that hangs over the ears, like a pair of glasses, with various devices built into the frame.

The virtual images 30 do not necessarily need to be stationary in the space 40 and may instead move within the space 40 along prescribed paths.

An example has been described in which the gestures of a user are detected and accepted as input operations, but the present disclosure is not limited to this example. For example, input operations may be accepted by a controller held in the user's hand or worn on the user's body.

The present disclosure has been described using an example in which display instruction is performed using an instructional image 31 from the external device 20 to the wearable terminal device 10 during the execution of a voice call via speech data communication. However, not limited to this example, display instruction may be performed using an instructional image 31 without involving speech data communication.

Although an example of a voice call between the wearable terminal device 10 and the external device 20 is used in the description, a voice call does not need to be used and a video call may also be possible. In this case, a webcam capturing images of a remote operator can be installed in the external device 20, and image data captured by the webcam can be transmitted to the wearable terminal device 10 and displayed on the display 14.

The instructional images 31 are not limited to those displayed for providing work instructions to the user of the wearable terminal device 10. The instructional images 31 include any virtual images 30 that are displayed on the wearable terminal device 10 based on the instructions of an instructor (including the user himself/herself) for the purpose of being made visible to the user of the wearable terminal device 10.

Other specific details of the configurations and control operations described in the above embodiments can be changed as appropriate without departing from the intent of the present disclosure. The configurations and control operations described in the above embodiments can be combined as appropriate to the extent that the resulting combinations do not depart from the intent of the present disclosure.

INDUSTRIAL APPLICABILITY

The present disclosure can be used in wearable terminal devices, programs, and display methods.

REFERENCE SIGNS

1 display system
10 wearable terminal device
10a body
11 CPU (processor)
12 RAM
13 storage unit
131 program
132 virtual image data
14 display
141 visor (display member)
142 laser scanner
15 sensor unit
151 acceleration sensor
152 angular velocity sensor
153 depth sensor
154 camera
155 eye tracker
16 communication unit
17 microphone
18 speaker
19 bus
20 external device
21 CPU
22 RAM
23 storage unit
231 program
24 operation display
25 communication unit
26 bus
30 virtual image
301 function bar
302 window shape change button
303 close button
31, 31a to 31c instructional image
40 space
41 visible area
42 instructor screen
51 virtual line
52 pointer

61 user icon
62 arrow icon
63 pen input icon
64 image icon
65 color palette
66 notification display
80 information processing apparatus
81 CPU
82 RAM
83 storage unit
831 program
84 operation display
85 communication unit
86 bus
A user (instructor)
B, C remote instructor (instructor)
N network

The invention claimed is:

1. A wearable terminal device configured to be used by being worn by a user, the wearable terminal device comprising:
a display;
a communication unit; and
at least one processor,
wherein the at least one processor
causes the display to display a first instructional image located inside a space based on a first instruction received by the communication unit from a first external device of a first instructor among a plurality of instructors that displays the first instructional image located inside the space, the first instructional image being displayed on the display in a first color associated with the first instructor,
causes the display to display, with the first instructional image inside the space, a second instructional image inside the space based on a second instruction received by the communication unit from a second external device of a second instructor among the plurality of instructors that displays the second instructional image located inside the space, the second instructional image being displayed on the display in a second color associated with the second instructor, and
causes the communication unit to transmit instructional data to the second external device, the instructional data including the first instructional image in the first color, to cause the second external device to display the first instructional image in the first color and the second instructional image on the second external device.

2. The wearable terminal device according to claim 1, wherein the display includes a display member that is transparent to light, and
the at least one processor displays the first instructional image and the second instructional image on a display surface of the display member visible in the space that is visible through the display member.

3. The wearable terminal device according to claim 1, further comprising:
a camera configured to capture an image of the space,
wherein the at least one processor causes the display to display an image of the space captured by the camera and the first instructional image and the second instructional image superimposed on the image of the space.

4. The wearable terminal device according to claim 1, wherein the user is included in the plurality of instructors.

5. The wearable terminal device according to claim 1, wherein the communication unit is configured to perform speech data communication with the first external device and the second external device, and wherein the at least one processor causes the display to display the first instructional image and the second instructional image while performing the speech data communication via the communication unit.

6. The wearable terminal device according to claim 5, wherein the at least one processor associates a different display mode of a plurality of display modes with each of the plurality of instructors participating in a voice call via the speech data communication, and causes the display to display instructional images in display modes associated with the plurality of instructors.

7. The wearable terminal device according to claim 6, wherein the plurality of display modes associated with the plurality of instructors is determined independently of display modes of external devices of the plurality of instructors.

8. The wearable terminal device according to claim 5, wherein in the speech data communication, each of the plurality of instructors is associated with a differently colored identification sign of a plurality of identification signs, and the at least one processor causes the display to display instructional images in colors of the plurality of identification signs associated with the plurality of instructors.

9. The wearable terminal device according to claim 1, wherein the at least one processor accepts, from an instructor among the plurality of instructors, an operation for selecting one display mode from among a plurality of display modes that can be selected and causes the display to display an instructional image in the one display mode, and the plurality of display modes that can be selected excludes a display mode of an instructional image that is already displayed when the instructor selects the one display mode.

10. The wearable terminal device according to claim 1, wherein the at least one processor accepts, from an instructor among the plurality of instructors, an operation for selecting one display mode from among a plurality of display modes that can be selected and causes the display to display an instructional image in the one display mode, and causes the display to display a prescribed notification display when the instructor attempts to select the one display mode of an instructional image, among instructional images, that is already displayed when the instructor selects the one display mode.

11. The wearable terminal device according to claim 1, wherein after causing the display to display an instructional image in any display mode, the at least one processor changes display modes of instructional images being displayed so that the instructional images are displayed in different display modes for each of the plurality of instructors.

12. The wearable terminal device according to claim 1, wherein the at least one processor adds different characters or symbols, for each instructor, to display instructional images based on instructions of each instructor.

13. The wearable terminal device according to claim 12, wherein the characters include a name, alias, or abbreviated name of each instructor.

14. The wearable terminal device according to claim 12, wherein the at least one processor adds the characters or symbols to display the instructional images when a distance between a position of the user in the space and a display position of an instructional image is less than or equal to a prescribed reference distance.

15. The wearable terminal device according to claim 12, wherein the at least one processor adds the characters or symbols to display of an instructional image when a prescribed operation is performed on the instructional image.

16. The wearable terminal device according to claim 1, wherein the first instructional image and the second instructional image include a document image of a prescribed format.

17. The wearable terminal device according to claim 1, wherein the first instructional image and the second instructional image include an image of a virtual object.

18. The wearable terminal device according to claim 17, wherein the virtual object is an object representing a path traced by pen input.

19. The wearable terminal device according to claim 17, wherein the virtual object is an arrow-shaped object having a specific position and a specific orientation.

20. A non-transitory computer-readable storage medium storing a program configured to cause a computer provided in a wearable terminal device configured to be used by being worn by a user to:

cause a display to display a first instructional image located inside a space based on a first instruction received by a communication unit from a first external device of a first instructor among a plurality of instructors that displays the first instructional image located inside the space, the first instructional image being displayed on the display in a first color associated with the first instructor, cause the display to display, with the first instructional image inside the space, a second instructional image inside the space based on a second instruction received by the communication unit from a second external device of a second instructor among the plurality of instructors that displays the second instructional image located inside the space, the second instructional image being displayed on the display in a second color associated with the second instructor, and cause the communication unit to transmit instructional data to the second external device, the instructional data including the first instructional image in the first color, to cause the second external device to display the first instructional image in the first color and the second instructional image on the second external device.

21. A display method for use in a wearable terminal device configured to be used by being worn by a user, the display method comprising:

causing a display to display a first instructional image located inside a space based on a first instruction received by a communication unit from a first external device of a first instructor among a plurality of instructors that displays the first instructional image located inside the space, the first instructional image being displayed on the display in a first color associated with the first instructor, causing the display to display, with the first instructional image inside the space, a second instructional image inside the space based on a second instruction received by the communication unit from a second external device of a second instructor among the plurality of instructors that displays the second instructional image located inside the space, the second instructional image being displayed on the display in a second color associated with the second instructor, and causing the communication unit to transmit instructional data to the second external device, the instructional data including the first instructional image in the first color, to cause the second external device to display the first instructional image in the first color and the second instructional image on the second external device.

\* \* \* \* \*